(12) United States Patent
Lee et al.

(10) Patent No.: US 10,351,062 B2
(45) Date of Patent: Jul. 16, 2019

(54) CLOAKING DEVICES CONSTRUCTED FROM REFLECTION BOUNDARIES AND HALF-MIRRORS AND VEHICLES COMPRISING THE SAME

(71) Applicant: Toyota Motor Engineering & Manufacturing North America, Inc., Erlanger, KY (US)

(72) Inventors: Kyu-Tae Lee, Ann Arbor, MI (US); Chengang Ji, Ann Arbor, MI (US); Songtao Wu, Ann Arbor, MI (US); Debasish Banerjee, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/813,830

(22) Filed: Nov. 15, 2017

(65) Prior Publication Data

US 2019/0146196 A1    May 16, 2019

(51) Int. Cl.
*B60R 1/00* (2006.01)
*B60R 1/08* (2006.01)
(Continued)

(52) U.S. Cl.
CPC .............. *B60R 1/007* (2013.01); *B60R 1/081* (2013.01); *B60R 1/082* (2013.01); *B60R 1/10* (2013.01);
(Continued)

(58) Field of Classification Search
CPC ......... B60R 1/007; B60R 1/082; B60R 1/081; G02B 27/14; G02B 27/283; G02B 5/3083;
(Continued)

(56) References Cited

U.S. PATENT DOCUMENTS 5,392,161 A * 2/1995 Weder ................... A63H 33/22
                                                  359/861
9,405,118 B1 * 8/2016 Lu .......................... G02B 27/00
(Continued)

FOREIGN PATENT DOCUMENTS

| CN | 201681201 U | 12/2010 |
| CN | 103287340 A | 9/2013 |
| DE | 102007060870 A1 | 7/2008 |

OTHER PUBLICATIONS

Lerma, Miguel A., "A mirror based event cloaking device", Jan. 26, 2012, pp. 1-7; URL: http://www.math.northwestern.edu/~mlerma/papers/event_cloaking.pdf.
(Continued)

*Primary Examiner* — Bao-Luan Q Le
(74) *Attorney, Agent, or Firm* — Dinsmore & Shohl LLP

(57) ABSTRACT

A cloaking device includes an object-side, an image-side, and a cloaked region (CR) between the object-side and the image-side. An object-side CR reflection boundary, an object-side half-mirror, and an object-side external reflection boundary are positioned on the object-side, and an image-side CR reflection boundary, an image-side half-mirror, and an image-side external reflection boundary are positioned on the image-side. The object-side half-mirror and the object-side external reflection boundary are spaced apart and generally parallel to the object-side CR reflection boundary, and the image-side half-mirror and the image-side external reflection boundary are spaced apart and generally parallel to the image-side CR reflection boundary. Light from an object located on the object-side of the cloaking device and obscured by the CR is redirected around the CR via two optical paths to form an image of the object on the image-side of the cloaking device.

20 Claims, 9 Drawing Sheets

(51) Int. Cl.
  *G02B 27/14* (2006.01)
  *G02B 17/00* (2006.01)
  *B60R 1/10* (2006.01)
  *G02B 27/10* (2006.01)

(52) U.S. Cl.
  CPC ....... *G02B 17/008* (2013.01); *G02B 27/1086* (2013.01); *G02B 27/14* (2013.01); *G02B 27/144* (2013.01); *G02B 27/145* (2013.01); *G02B 27/146* (2013.01)

(58) Field of Classification Search
  CPC .. G02B 17/06; G02B 27/1086; G02B 27/144; G02B 5/30; G02B 5/3025; G02B 27/145; G02B 27/146
  See application file for complete search history.

(56) References Cited

U.S. PATENT DOCUMENTS

| | | | |
|---|---|---|---|
| 9,557,547 B2* | 1/2017 | Choi | G02B 17/008 |
| 9,588,325 B2* | 3/2017 | Robertson | G03B 21/56 |
| 9,739,990 B2* | 8/2017 | Wu | G02B 17/023 |
| 9,971,161 B2* | 5/2018 | Chen | H01Q 15/08 |
| 2015/0183375 A1* | 7/2015 | Wu | G02B 17/023 359/734 |
| 2015/0248013 A1* | 9/2015 | Chen | H01Q 15/08 359/625 |
| 2016/0025956 A1* | 1/2016 | Choi | G02B 17/008 359/730 |
| 2017/0227781 A1 | 8/2017 | Banerjee et al. | |

OTHER PUBLICATIONS

"Physics demonstrations: cloaking device?", Apr. 25, 2013; URL: https://skullsinthestars.com/2013/04/25/physics-demonstrations-cloaking-device/.

Banerjee, Debasish et al., "Invisibility cloak with image projection capability", Sci. Rep., 6: 38965 (2016).

* cited by examiner

CLOAKING DEVICES CONSTRUCTED FROM REFLECTION BOUNDARIES AND HALF-MIRRORS AND VEHICLES COMPRISING THE SAME

TECHNICAL FIELD

The present specification generally relates to apparatuses and methods for making an object appear transparent and, more specifically, to cloaking devices for pillars of vehicles and vehicles comprising the same.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device includes an object-side, an image-side, a cloaked region (CR) between the object-side and the image-side, and a reference optical axis extending from the object-side to the image-side. An object-side CR reflection boundary, an object-side half-mirror, and an object-side external reflection boundary are positioned on the object-side of the cloaking device and an image-side CR reflection boundary, an image-side half-mirror, and an image-side external reflection boundary are positioned on the image-side. The object-side half-mirror and the object-side external reflection boundary are spaced apart and generally parallel to the object-side CR reflection boundary, and the image-side half-mirror and the image-side external reflection boundary are spaced apart and generally parallel to the image-side CR reflection boundary. Light from an object located on the object-side of the cloaking device and obscured by the CR is redirected around the CR via two optical paths to form an image of the object on the image-side of the cloaking device such that the light from the object appears to pass through the CR. Particularly, light from the object on the object-side of the cloaking device is redirected around the CR via a first optical path and a second optical path that is different than the first optical path. Light on the first optical path is reflected by the object-side half-mirror and the image-side half-mirror and light on the second optical path is transmitted through the object-side half-mirror and the image-side half-mirror. In some embodiments, the object-side external reflection boundary is spaced apart from and generally parallel to the object-side half-mirror and the image-side external reflection boundary is spaced apart from and generally parallel to the image-side half-mirror. In such embodiments, the object-side half-mirror and the image-side half-mirror are positioned between the object-side external reflection boundary and the image-side external reflection boundary. Also, the first optical path is: Object —object-side CR reflection boundary—object-side external reflection boundary—object-side half-mirror—image-side half-mirror—image-side external reflection boundary—image-side CR reflection boundary—Image; and the second optical path is: Object—object-side CR reflection boundary—object-side half-mirror—image-side half-mirror—image-side CR reflection boundary—Image. In other embodiments, the object-side external reflection boundary is coplanar with the object-side half-mirror, and the image-side external reflection boundary is coplanar with the image-side half-mirror. In such embodiments, the first optical path is: Object—object-side CR reflection boundary—object-side half-mirror—object-side CR reflection boundary—object-side external reflection boundary—image-side external reflection boundary—image-side CR reflection boundary—image-side half-mirror—image-side CR reflection boundary—Image; and the second optical path is: Object—object-side half-mirror—object-side CR reflection boundary—object-side external reflection boundary—image-side external reflection boundary—image-side CR reflection boundary—image-side half-mirror—Image.

According to another embodiment, a cloaking device assembly includes an object-side, an image-side, a cloaked region (CR) between the object-side and the image-side, and a reference optical axis extending from the object-side to the image-side. First object-side and first image-side CR reflection boundaries, first object-side and first image-side external reflection boundaries, and first object-side and first image-side half-mirrors are positioned on a first side of the reference optical axis. Also, second object-side and second image-side CR reflection boundaries, second object-side and second image-side external reflection boundaries, and second object-side and second image-side half-mirrors are positioned on a second side of the reference optical axis opposite the first side. The first object-side and first image-side external reflection boundaries and the first object-side and first image-side half-mirrors are spaced apart from and generally parallel to the first object-side and first image-side CR reflection boundaries. Also, the second object-side and second image-side external reflection boundaries and the second object-side and second image-side half-mirrors are spaced apart from and generally parallel to the second object-side and second image-side CR reflection boundaries. Light from an object located on the object-side of the cloaking device and obscured by the CR is redirected around the CR via two optical paths on the first side of the reference optical axis and two optical paths on the second side of the reference optical axis to form an image of the object on the image-side of the cloaking device such that the light from the object appears to pass through the CR.

According to another embodiment, a vehicle includes an A-pillar and a cloaking device positioned on the A-pillar. The cloaking device includes an object-side, an image-side, and a cloaked region (CR) between the object-side and the image-side. The A-pillar is positioned within the cloaked region, the object-side is positioned on an exterior of the vehicle and the image-side is positioned within an interior of the vehicle. An object-side CR reflection boundary, an object-side half-mirror, and an object-side external reflection boundary are positioned on the object-side of the cloaking device and an image-side CR reflection boundary, an image-side half-mirror, and an image-side external reflection boundary are positioned on the image-side. The object-side half-mirror and the object-side external reflection boundary are spaced apart and generally parallel to the object-side CR reflection boundary, and the image-side half-mirror and the image-side external reflection boundary are spaced apart and generally parallel to the image-side CR reflection boundary. Light from an object located on the object-side of the cloaking device and obscured by the A-pillar is redirected around the A-pillar via two optical paths to form an image of the object on the image-side of the cloaking device such that the light from the object appears to pass through the A-pillar. Particularly, light from the object is redirected around the A-pillar via a first optical path is reflected by the object-side half-mirror and the image-side half-mirror, and light from the object on the object-side of the cloaking device redirected around the A-pillar via a second optical path is transmitted through the object-side half-mirror and the image-side half-mirror. In embodiments, the object-side external reflection boundary is spaced apart and generally parallel to the object-side half-mirror, the image-side external reflection boundary is spaced apart and generally parallel to the image-side half-mirror, and the object-side half-mirror and the image-side half-mirror are positioned between the object-side external reflection boundary and the image-side external reflection boundary. In other embodiments, the object-side external reflection boundary is coplanar with the object-side half-mirror, and the image-side external reflection boundary is coplanar with the image-side half-mirror.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a plurality of reflection boundaries and half-mirrors positioned around a cloaked region that reflect and transmit light around a cloaked region. The cloaking devices described herein may be used to cloak vehicle articles such as a vehicle A-pillar, B-pillar, C-pillar, D-pillar, etc., and remove a "blind spot" caused by the vehicle article. A blind spot refers to a region of the vehicle where an occupant's view may be obstructed. In the alternative, or in addition to, cloaking devices described herein may be used to cloak home, office and industrial articles such as extension cords, electrical conduit, piping, etc. The utilization of the reflection boundaries and half-mirrors allows an individual to perceive an image which, if not for the cloaking device, would be obstructed by an article. For example, utilization of the reflection boundaries and half-mirrors allows a driver of a vehicle to perceive an image which, if not for the cloaking device, would be obstructed by a pillar of the vehicle. Various embodiments of cloaking devices and vehicles comprising the same will be described in further detail herein with specific reference to the appended drawings.

Figure 1:
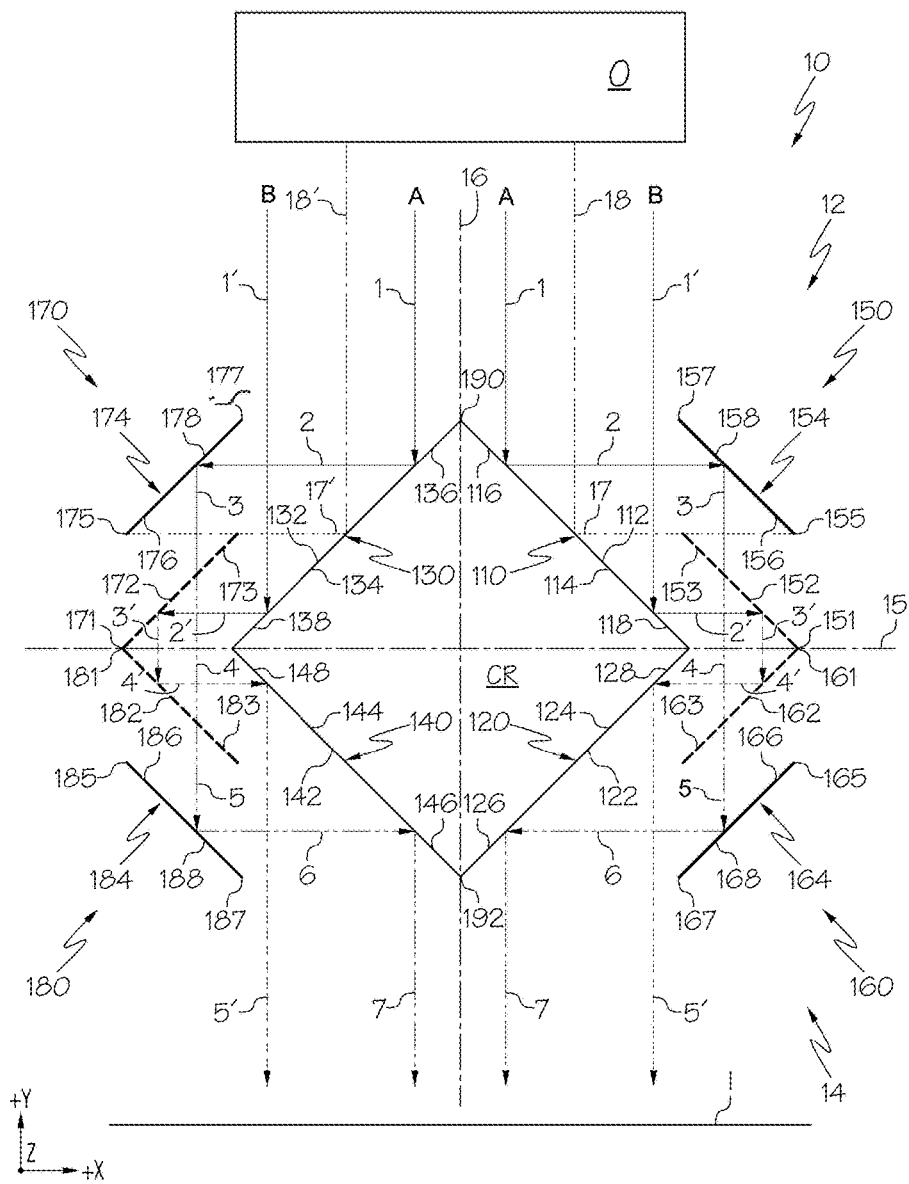
FIG. 1 schematically depicts a top view of a cloaking assembly according to one or more embodiments described and illustrated herein.

FIG. 1 generally depicts one embodiment of a cloaking device. The cloaking device includes an object-side, an image-side, and a cloaked region (CR) between the image-side and the object-side. A CR reflection boundary, an external reflection boundary, and a half-mirror are positioned on the object-side of the cloaking device, and another CR reflection boundary, external reflection boundary, and half-mirror are positioned on the image-side of the cloaking device. As used herein, the terms "boundaries" and "boundary" refer to a planar physical surface and the term "external" refers to a boundary spaced apart from (i.e., positioned) a predetermined distance from, one of the CR reflection boundaries. Also, the term "half-mirror" refers to a planar optical filter that allows light waves of a specific polarization (e.g., p-polarized light or s-polarized light) to pass through the optical filter and reflects light waves of other polarizations (e.g., s-polarized light or p-polarized light). Light from an object located on the object-side of the cloaking device and obscured by the cloaked region is redirected around the cloaked region via two optical paths to form an image of the object on the image-side of the cloaking device such that the light from the object appears to pass through the cloaked region. As used herein, the term "two optical paths" refers to a first optical path and a second optical path that is different than the first optical path due to different reflections by and/or transmittances through a plurality of optical components. For example, one optical path may include reflection of light from the object by the CR reflection boundaries and external reflection boundaries, and transmittance of the light though the half-mirrors and another optical path may include reflection of the light from the object by the CR reflection boundaries and the half-mirrors. Accordingly, an individual will see the object located on the opposite side of the cloaked region (and thus on the opposite side of a cloaked article) giving the visual impression that the cloaked article is transparent.

Still referring to FIG. 1, embodiments of a cloaking device include a cloaking assembly 10 with an object-side 12, an image-side 14 and four CR reflection boundaries 110, 120, 130, 140. The object-side 12 is positioned above (+Y direction) a bisecting axis 15 and the image-side 14 is positioned below (−Y direction) the bisecting axis 15. That is, the bisecting axis 15 extends between and delineates the object-side 12 and the image-side 14. Each of the four CR reflection boundaries 110, 120, 130, 140 has a length along the X-axis, a width along the Y-axis and a height along the Z-axis shown in the figures. That is, the X-axis shown in the figures extends along a length of the four CR reflection boundaries 110, 120, 130, 140, the Y-axis shown in the figures extends along a width of the four CR reflection boundaries 110, 120, 130, 140, and the Z-axis shown in the figures extends along a height of the four CR reflection boundaries 110, 120, 130, 140.

The two CR reflection boundaries 110, 130 may be positioned on the object-side 12 of the cloaking assembly 10 to face an object 'O' and may be referred to herein as object-side CR reflection boundaries 110, 130. Also, the object-side CR reflection boundary 110 is positioned on a first side (+X direction) of the reference optical axis 16 and may be referred to herein as a first object-side CR reflection boundary 110 and the object-side CR reflection boundary 130 is positioned on a second side (−X direction) of the reference optical axis 16 opposite the first side and may be referred to herein as a second object-side CR reflection boundary 130. The two CR reflection boundaries 120, 140 may be positioned on the image-side 14 of the cloaking assembly 10 to provide an image 'I' formed by the cloaking assembly 10 and may be referred to herein as image-side CR reflection boundaries 120, 140. The image-side CR reflection boundary 120 is positioned on the first side (+X direction) of the reference optical axis 16 and may be referred to herein as a first image-side CR reflection boundary 120 and the image-side CR reflection boundary 140 is positioned on the second side (−X direction) of the reference optical axis 16 opposite the first side and may be referred to herein as a second image-side CR reflection boundary 140.

The CR reflection boundaries 110, 120, 130, 140 each have an outward facing reflection surface 112, 122, 132, 142 and an inward facing surface 114, 124, 134, 144, respectively. The term "outward" used herein refers to a surface that faces away and/or reflects light away from a cloaked region 'CR' bounded at least partially by the CR reflection boundaries 110, 120, 130, 140, and the term "inward" used herein refers to a surface that faces towards and/or reflects light towards the cloaked region CR. In embodiments, one or more of the inward facing surfaces 114, 124, 134, 144 may be an opaque surface thereby preventing light from within the cloaked region CR from propagating through one or more of the CR reflection boundaries 110, 120, 130, 140, respectively. The outward facing reflection surfaces 112, 122, 132, 142 can be made from omnidirectional photonic crystals or mirrors such that light incident on the outward facing reflection surfaces 112, 122, 132, 142 is reflected there from. In the alternative, one or more of the outward facing reflection surfaces 112, 122, 132, 142 may be a reflection surface of a prism, e.g., a right angle prism, that totally internally reflects light incident on the surface. As used herein, the term "reflection surface" refers to a surface that reflects all modes of light (e.g. s-polarized light and p-polarized light) incident on the reflection surface. Also, as used herein the term "reflected there from" refers to at least 60% of incident light being reflected from a surface. In some embodiments, at least 70% of incident light is reflected from the surface, while in other embodiments at least 80% of incident light is reflected from the surface. In still other embodiments, at least 90% of incident light, for example at least 95% of incident light is reflected from the surface.

The CR reflection boundaries 110, 120, 130, 140 may have an apex end 116, 126, 136, 146 and a side end 118, 128, 138, 148, respectively. The side ends 118, 128, 138, 148 are spaced apart from the apex ends 116, 126, 136, 146, respectively, and the CR reflection boundaries 110, 120, 130, 140 extend between apex ends 116, 126, 136, 146 and side ends 118, 128, 138, 148, respectively. In embodiments, the apex ends 116, 136 of the two object-side CR reflection boundaries 110, 130, respectively, meet or intersect at an apex 190, and in the alternative or in addition to, the apex ends 126, 146 of the two image-side CR reflection boundaries 120, 140, respectively, meet or intersect at an apex 192. In such embodiments, the reference optical axis 16 bisects the apex 190 and the apex 192, and may be a centerline between a first side (+X direction) and a second side (−X direction) of the cloaking assembly 10. In other embodiments, the apex ends 116, 136 of the two object-side CR reflection boundaries 110, 130, respectively, are spaced apart from each other and/or the apex ends 126, 146 of the two image-side CR reflection boundaries 120, 140, respectively, are spaced apart from each other such that a uncloaked region or gap (not shown) is present between the spaced apart apex ends 116, 136 and/or spaced apart apex ends 126, 146. In such embodiments, an image of the portion of the object O positioned above (+Y direction) the uncloaked region is not provided on the image-side 14 of the cloaking assembly 10. Also, in embodiments, the side end 118 may be positioned adjacent to and may be joined to side end 128 and the side end 138 may be positioned adjacent to and may be joined to side end 148 as depicted in FIG. 1. In other embodiments, the side ends 118, 138 may be spaced apart (Y direction) from the side ends 128, 148 (not shown).

In embodiments, the two object-side CR reflection boundaries 110, 130 and the two image-side CR reflection boundaries 120, 140 form the cloaked region CR that is bound at least partly by the inward facing surfaces 114, 134, 124, 144. The two object-side CR reflection boundaries 110, 130 and the two image-side CR reflection boundaries 120, 140 have a height 'h' (FIG. 5) in the Z-direction of the coordinate axes in the figures and light reflected or transmitted within the cloaked region CR does not pass through the inward facing surfaces 114, 134, 124, 144. Accordingly, an article located within the cloaked region CR (e.g., a cloaked article) is not visible to an observer viewing the cloaking assembly 10 from the image-side 14 in the +Y direction.

Still referring to FIG. 1, the cloaking assembly 10 may include four external optical component assemblies 150, 160, 170, 180 spaced apart and oriented generally parallel (within +/−2°) to each of the CR reflection boundaries 110, 120, 130, 140, respectively. In embodiments, the four external optical component assemblies 150, 160, 170, 180 may include four half-mirrors 152, 162, 172, 182 and four external reflection boundaries 154, 164, 174, 184 spaced apart and oriented generally parallel to each of the CR reflection boundaries 110, 120, 130, 140, respectively. Each of the half-mirrors 152, 162, 172, 182, and each of the four external reflection boundaries 154, 164, 174, 184, has a length along the X-axis, a width along the Y-axis and a height along the Z-axis shown in the figures. As depicted in FIG. 1, the four external reflection boundaries 154, 164, 174, 184 may be spaced apart and oriented generally parallel to each of the four half-mirrors 152, 162, 172, 182, respectively. The two half-mirrors 152, 172 and the two external reflection boundaries 154, 174 may be positioned on the object-side 12 of the cloaking assembly 10 and may be referred to herein as object-side half-mirrors 152, 172 and object-side external reflection boundaries 154, 174, respectively. The object-side half-mirror 152 and the object-side external reflection boundary 154 are positioned on the first side (+X direction) of the reference optical axis 16 and may be referred to herein as a first object-side half-mirror 152 and a first object-side external reflection boundary 154. The object-side half-mirror 172 and the object-side external reflection boundary 174 are positioned on the second side (−X direction) of the reference optical axis 16 opposite the first side and may be referred to herein as a second object-side half-mirror 172 and a second object-side external reflection boundary 174. The two half-mirrors 162, 182 and the two external reflection boundaries 164, 184 may be positioned on the image-side 14 of the cloaking assembly 10 and may be referred to herein as image-side half-mirrors 162, 182 and image-side external reflection boundaries 164, 184, respectively. The image-side half-mirror 162 and the image-side external reflection boundary 164 are positioned on the first side (+X direction) of the reference optical axis 16 and may be referred to herein as a first image-side half-mirror 162 and a first image-side external reflection boundary 164. The image-side half-mirror 182 and the image-side external reflection boundary 184 are positioned on the second side (−X direction) of the reference optical axis 16 opposite the first side and may be referred to herein as a second image-side half-mirror 182 and a second image-side external reflection boundary 184.

Each of the half-mirrors 152, 162, 172, 182 includes a first end 151, 161, 171, 181, respectively, proximal to the bisecting axis 15 and a second end 153, 163, 173, 183, respectively, distal from the bisecting axis 15. Also, the external reflection boundaries 154, 164, 174, 184 include a first end 155, 165, 175, 185, respectively, proximal to the bisecting axis 15 and a second end 157, 167, 177, 187, respectively, distal from the bisecting axis 15. The second end 153 of the first object-side half-mirror 152 and the first end 155 of the first object-side external reflection boundary 154 may be positioned on a line 17 extending parallel to the X-axis depicted in FIG. 1. Extending from the intersection of the line 17 and the first object-side CR reflection boundary 110 in the +Y direction is an optical path transition axis 18 discussed in greater detail below. Similarly, the second end 173 of the second object-side half-mirror 172 and the first end 175 of the second object-side external reflection boundary 174 may be positioned on a line 17' extending parallel to the X-axis depicted in FIG. 1. Extending from the intersection of the line 17' and the second object-side CR reflection boundary 130 in the +Y direction is an optical path transition axis 18' discussed in greater detail below. In embodiments, the line 17 and the line 17' are co-linear. In other embodiments, the line 17 and the line 17' are not co-linear.

The half-mirrors 152, 162, 172, 182 reflect a specific mode of visible light. Specifically, each of the half-mirrors 152, 162, 172, 182 may be an s-polarizer half-mirror or a p-polarizer half-mirror. The half-mirrors 152, 162, 172, 182 may be in the form of a diffraction grating or thin film polarizer that reflects the s-mode of visible light and allows the p-mode of visible light to pass through (a p-polarization diffraction grating or thin film), or in the alternative, reflects the p-mode of visible light and allows the s-mode of the visible light to pass through (an s-polarization diffraction grating or thin film). The half-mirrors 152, 162 may be both s-polarizer half-mirrors or p-polarizer half-mirrors and the half-mirrors 172, 182 may be both s-polarizer half-mirrors or p-polarizer half-mirrors. That is, the half-mirrors 152, 162 may be s-polarizer mirrors and the half-mirrors 172, 182 may be p-polarizer half-mirrors; the half-mirrors 152, 162 may be p-polarizer mirrors and the half-mirrors 172, 182 may be s-polarizer half-mirrors; or all of the half-mirrors 152, 162, 172, 182 may be s-polarizer half-mirrors or p-polarizer half-mirrors.

Each of the external reflection boundaries 154, 164, 174, 184 has an inward facing reflection surface 156, 166, 176, 186 and an outward facing surface 158, 168, 178, 188, respectively. The inward facing reflection surfaces 156, 166, 176, 186 can be made from omnidirectional photonic crystals or mirrors such that light incident on the inward facing reflection surfaces 156, 166, 176, 186 is reflected there from. In the alternative, one or more of the inward facing reflection surfaces 156, 166, 176, 186 may be a surface of a prism, e.g., a right angle prism, that totally internal reflects light incident on the surface. In embodiments, one or more of the outward facing surfaces 158, 168, 178, 188 may be an opaque surface that may prevent or block light from propagating through the external reflection boundaries 154, 164, 174, 184, respectively.

Still referring to FIG. 1, light from the object O on the first side (+X direction) of the reference optical axis 16 travels from the object-side 12 around the cloaked region CR and forms a portion of an image 'I' on the image-side 14 via two different optical paths. Particularly, light from the object positioned above (+Y direction) the cloaking assembly 10 between the reference optical axis 16 and the optical path transition axis 18 that incident on the cloaking assembly 10 (shown as arrow '1' in FIG. 1) travels from the object-side 12 around the cloaked region CR and forms a portion of an image 'I' via a first optical path 'A'. Light from the object positioned above (+Y direction) the cloaking assembly 10 between the optical path transition axis 18 and the second end 157 of the first object-side external reflection boundary 154 that is incident on the cloaking assembly 10 (shown as arrow 1' in FIG. 1) travels from the object-side 12 around the cloaked region CR and forms a portion of the image I via a second optical path 'B'. Accordingly, the optical path transition axis 18 delineates a first portion on the first side (+X direction) of the cloaking assembly 10 with a first optical path (e.g., optical path A) from a second portion on the first side (+X direction) of the cloaking assembly 10 with a second optical path (e.g., optical path B).

Regarding the first optical path A on the first side (+X direction) of the reference optical axis 16, the first object-side CR reflection boundary 110 is positioned relative to the first object-side external reflection boundary 154 such that light 1 from the object O is reflected by the outward facing reflection surface 112 of the first object-side CR reflection boundary 110 onto the first object-side external reflection boundary 154 (shown as arrow '2' in FIG. 1). Light 2 is reflected by the inward facing reflection surface 156 of the first object-side external reflection boundary 154. The first external reflection boundary 154 is positioned relative to the first object-side half-mirror 152 such that light 2 is reflected by the inward facing reflection surface 156 onto the first object-side half-mirror 152 (shown as arrow '3' in FIG. 1). Light 3 is polarized by the first object-side half-mirror 152 such that one mode of light 3 is transmitted through the first object-side half-mirror 152 and another mode of light 3 is reflected by the first object-side half-mirror 152. A non-limiting example of the first object-side half-mirror 152 in the form of a p-polarization half-mirror is depicted in FIG. 1. Accordingly, p-polarized light (shown as double-dashed center lines in the figures in contrast to single-dashed center lines for the bisecting axis 15 and the reference optical axis 16) is transmitted through the first object-side half-mirror 152 (shown as arrow '4' in FIG. 1). The first object-side half-mirror 152 is positioned relative to the first image-side half-mirror 162 such that light 4 propagates to and is incident on the first image-side half-mirror 162. As noted above, the first image-side half-mirror 162 is the same type of half-mirror (polarizer) as the first object-side half-mirror 152. Accordingly, the first image-side half-mirror 162 is a p-polarized half-mirror and light 4 propagates through the first image-side half-mirror 162 (shown as arrow '5' in FIG. 1). The first image-side half-mirror 162 is positioned relative to the first image-side external reflection boundary 164 such that light 5 propagates to and is incident on the first image-side external reflection boundary 164. Light 5 is reflected by the inward facing reflection surface 166 of the first image-side external reflection boundary 164 (shown as arrow '6' in FIG. 1). The first image-side external reflection boundary 164 is positioned relative to the first image-side CR reflection boundary 120 such that light 6 propagates to and is incident on the outward facing reflection surface 122 of the first image-side CR reflection boundary 120. Light 6 is reflected generally parallel to light 1 by the outward facing reflection surface 122 (shown as arrow '7' in FIG. 1) and forms a portion of the image I on the image-side 14 of the cloaking assembly 10. It should be understood that the portion of the image I formed by light that travels from the object-side 12 around the cloaked region CR via the first optical path A on the first side (+X direction) of the reference optical axis 16 corresponds to the portion of the object O positioned above (+Y direction) the cloaking assembly 10 between the reference optical axis 16 and the optical path transition axis 18.

Accordingly, light from the object O may travel from the object-side 12 to the image-side 14 via the first optical path A: object O—first object-side CR reflection boundary 110—first object-side external reflection boundary 154—first object-side half-mirror 152—first image-side half-mirror 162—first image-side external reflection boundary 164—first image-side CR reflection boundary 120—image I. That is, light from the object O may travel from the object-side 12 to the image-side 14 via the first optical path A: object O—reflection from the outward facing reflection surface 112 of the first object-side CR reflection boundary 110—reflection from the inward facing reflection surface 156 of the first object-side external reflection boundary 154—transmittance through the first object-side half-mirror 152—transmittance through the first image-side half-mirror 162—reflection from the inward facing reflection surface 166 of the first image-side external reflection boundary 164—reflection from the outward facing reflection surface 122 of the first image-side CR reflection boundary 120—image I.

Regarding the second optical path B on the first side (+X direction) of the reference optical axis 16, the first object-side CR reflection boundary 110 is positioned relative to the first object-side half-mirror 152 such that light 1' is reflected by the outward facing reflection surface 112 of the first object-side CR reflection boundary 110 onto the first object-side half-mirror 152 (shown as arrow '2'' in FIG. 1). Light 2' is polarized by the first object-side half-mirror 152 such that one mode of light 2' is reflected by the first object-side half-mirror 152 and another mode of light 2' is transmitted through the first object-side half-mirror 152. As noted above, a non-limiting example of the first object-side half-mirror 152 in the form of a p-polarization half-mirror is depicted in FIG. 1. Accordingly, s-polarized light (shown as dashed lines in the figures) is reflected by the first object-side half-mirror 152 (shown as arrow '3'' in FIG. 1). The first object-side half-mirror 152 is positioned relative to the first image-side half-mirror 162 such that light 3' propagates to and is incident on the first image-side half-mirror 162. As noted above, the first image-side half-mirror 162 is the same type of half-mirror (polarizer) as the first object-side half-mirror 152. Accordingly, light 3' is reflected by the first image-side half-mirror 162 (shown as arrow '4'' in FIG. 1). The first image-side half-mirror 162 is positioned relative to the first image-side CR reflection boundary 120 such that light 4' propagates to and is incident on the outward facing reflection surface 122 of the first image-side CR reflection boundary 120. Light 4' is reflected generally parallel to light 1' by the outward facing reflection surface 122 as light 5' and forms a portion of the image I on the image-side 14 of the cloaking assembly 10. It should be understood that the portion of the image I formed by light that travels from the object-side 12 around the cloaked region CR via the second optical path B on the first side (+X direction) of the reference optical axis 16 corresponds to the portion of the object O positioned above (+Y direction) the cloaking assembly 10 between the optical path transition axis 18 and the second end 157 of the first object-side external reflection boundary 154.

Accordingly, light from the object O may travel from the object-side 12 to the image-side 14 via the second optical path B: object O—first object-side CR reflection boundary 110—first object-side half-mirror 152—first image-side half-mirror 162—first image-side CR reflection boundary 120—image I. That is, light from the object O may travel from the object-side 12 to the image-side 14 via the second optical path B: object O—reflection from the outward facing reflection surface 112 of the first object-side CR reflection boundary 110—reflection from the first object-side half-mirror 152—reflection from the first image-side half-mirror 162—reflection from the outward facing reflection surface 122 of the first image-side CR reflection boundary 120—image I.

Still referring to FIG. 1, light from the object O on the second side (−X direction) of the reference optical axis 16 travels from the object-side 12 around the cloaked region CR and forms a portion of an image 'I' via the two different optical paths A and B. Particularly, light from the object positioned above (+Y direction) the cloaking assembly 10 between the reference optical axis 16 and the optical path transition axis 18' that is incident on the cloaking assembly 10 (light 1) travels from the object-side 12 around the cloaked region CR and forms a portion of an image 'I' via the first optical path A. Light from the object positioned above (+Y direction) the cloaking assembly 10 between the optical path transition axis 18' and the second end 177 of the second object-side external reflection boundary 174 that is incident on the cloaking assembly 10 (light 1') travels from the object-side 12 around the cloaked region CR and forms a portion of the image I via the second optical path B.

Regarding the first optical path A on the second side (−X direction) of the reference optical axis 16, the second object-side CR reflection boundary 130 is positioned relative to the second object-side external reflection boundary 174 such that light 1 is reflected by the outward facing reflection surface 132 of the second object-side CR reflection boundary 130 onto the second object-side external reflection boundary 174 as light 2. Light 2 is reflected by the inward facing reflection surface 176 of the second object-side external reflection boundary 174. The second object-side external reflection boundary 174 is positioned relative to the second object-side half-mirror 172 such that light 2 is reflected by the inward facing reflection surface 176 onto the second object-side half-mirror 172 as light 3. Light 3 is polarized by the second object-side half-mirror 172 such that one mode of light 3 is transmitted through the second object-side half-mirror 172 and another mode of light 3 is reflected by the second object-side side half-mirror 172. A non-limiting example of the second object-side half-mirror 172 in the form of a p-polarization half-mirror is depicted in FIG. 1. Accordingly, p-polarized light is transmitted through the second object-side half-mirror 172 as light 4. The second object-side half-mirror 172 is positioned relative to the second image-side half-mirror 182 such that light 4 propagates to and is incident on the second image-side half-mirror 182. As noted above, the second image-side half-mirror 182 is the same type of half-mirror (polarizer) as the second object-side half-mirror 172. Accordingly, light 4 propagates through the second image-side half-mirror 182 as light 5. The second image-side half-mirror 182 is positioned relative to the second image-side external reflection boundary 184 such that light 5 propagates to and is incident on the second image-side external reflection boundary 184. Light 5 is reflected by the inward facing reflection surface 186 of the second image-side external reflection boundary 184 as light 6. The second image-side external reflection boundary 184 is positioned relative to the second image-side CR reflection boundary 140 such that light 6 propagates to and is incident on the outward facing reflection surface 142 of the second image-side CR reflection boundary 140. Light 6 is reflected generally parallel to light 1 by the outward facing reflection surface 142 as light 7 and forms a portion of the image I on the image-side 14 of the cloaking assembly 10. It should be understood that the portion of the image I formed by light that travels from the object-side 12 around the cloaked region CR via the second optical path A on the second side (−X direction) of the reference optical axis 16 corresponds to the portion of the object O positioned above (+Y direction) the cloaking assembly 10 between the reference optical axis 16 and the optical path transition axis 18'.

Accordingly, light from the object O may travel from the object-side 12 to the image-side 14 via the first optical path A: object O—second object-side CR reflection boundary 130—second object-side external reflection boundary 174—second object-side half-mirror 172—second image-side half-mirror 182—second image-side external reflection boundary 184—second image-side CR reflection boundary 140—image I. That is, light from the object O may travel from the object-side 12 to the image-side 14 via the first optical path A: object O—reflection from the outward facing reflection surface 132 of the second object-side CR reflection boundary 130—reflection from the inward facing reflection surface 176 of the second object-side external reflection boundary 174—transmittance through the second object-side half-mirror 172—transmittance through the second image-side half-mirror 182—reflection from the inward facing reflection surface 186 of the second image-side external reflection boundary 184—reflection from the outward facing reflection surface 142 of the second image-side CR reflection boundary 140—image I.

Regarding the second optical path B on the second side (−X direction) of the reference optical axis 16, the second object-side CR reflection boundary 130 is positioned relative to the second object-side half-mirror 172 such that light 1' is reflected by the outward facing reflection surface 132 of the second object-side CR reflection boundary 130 onto the second object-side half-mirror 172 as light 2'. Light 2' is polarized by the second object-side half-mirror 172 such that one mode of light 2' is reflected by the second object-side half-mirror 172 and another mode of light 2' is transmitted through the second object-side half-mirror 172. As noted above, a non-limiting example of the second object-side half-mirror 172 in the form of a p-polarization half-mirror is depicted in FIG. 1. Accordingly, s-polarized light is reflected by the second object-side half-mirror 172 as light 3'. The second object-side half-mirror 172 is positioned relative to the second image-side half-mirror 182 such that light 3' propagates to and is incident on the second image-side half-mirror 182. As noted above, the second image-side half-mirror 182 is the same type of half-mirror (polarizer) as the second object-side half-mirror 172. Accordingly, light 3' is reflected by the second image-side half-mirror 182 as light 4'. The second image-side half-mirror 182 is positioned relative to the second image-side CR reflection boundary 140 such that light 4' propagates to and is incident on the outward facing reflection surface 142 of the second image-side CR reflection boundary 140. Light 4' is reflected generally parallel to light 1' by the outward facing reflection surface 142 and forms a portion of the image I on the image-side 14 of the cloaking assembly 10. It should be understood that the portion of the image I formed by light that travels from the object-side 12 around the cloaked region CR via the second optical path B on the second side (−X direction) of the reference optical axis 16 corresponds to the portion of the object O positioned above (+Y direction) the cloaking assembly 10 between the optical path transition axis 18' and the second end 177 of the second object-side external reflection boundary 174.

Accordingly, light from the object O may travel from the object-side 12 to the image-side 14 via the second optical path B: object O—the second object-side CR reflection boundary 130—second object-side half-mirror 172—second image-side half-mirror 182—second image-side CR reflection boundary 140—image I. That is, light from the object O may travel from the object-side 12 to the image-side 14 via the second optical path B: object O—reflection from the outward facing reflection surface 132 of the second object-side CR reflection boundary 130—reflection from the second object-side half-mirror 172—reflection from the second image-side half-mirror 182—reflection from the outward facing reflection surface 142 of the second image-side CR reflection boundary 140—image I.

In combination, i.e., light 1 on the first side (+X direction) and the second side (−X direction) of the reference optical axis 16 from the object O on the object-side 12 of the cloaking assembly 10 propagates to the image-side 14 via the first optical paths A: object O—reflection from the outward facing reflection surfaces 112, 132 of the first and second object-side CR reflection boundaries 110, 130, respectively—reflection from the inward facing reflection surfaces 156, 176 of the first and second object-side external reflection boundaries 154, 174, respectively—transmittance through the first and second object-side half-mirrors 152, 172—transmittance through the first and second image-side half-mirrors 162, 182—reflection from the inward facing reflection surfaces 166, 186 of the first and second image-side external reflection boundaries 164, 184, respectively—reflection from the outward facing reflection surfaces 122, 142 of the first and second image-side CR reflection boundaries 120, 140, respectively—image I. Also, light 1' on the first side (+X direction) and the second side (−X direction) of the reference optical axis 16 from the object O on the object-side 12 of the cloaking assembly 10 propagates to the image-side 14 via the second optical paths B: object O—reflection from the outward facing reflection surfaces 112, 132 of the first and second object-side CR reflection boundaries 110, 130, respectively—reflection from the first and second object-side half-mirrors 152, 172—reflection from the first and second image-side half-mirrors 162, 182—reflection from the outward facing reflection surfaces 122, 142 of the first and second image-side CR reflection boundaries 120, 140, respectively—image I.

While FIG. 1 depicts the CR reflection boundaries 110, 120, 130, 140, half-mirrors 152, 162, 172, 182, and external reflection boundaries 154, 164, 174, 184 as stand-alone components, it should be understood that the CR reflection boundaries 110, 120, 130, 140 and the external optical component assemblies 150, 160, 170, 180 may be provided as a single unit or a plurality of assembled units. For example, the external optical component assemblies 150, 160, 170, 180 may be formed from a plurality of prisms that comprise the CR reflection boundaries 110, 120, 130, 140, the half-mirrors 152, 162, 172, 182, and the external reflection boundaries 154, 164, 174, 184. It should also be understood that the cloaking assembly 10 may cloak an object within the cloaked region CR including only the first object-side and image-side CR reflection boundaries 110, 120, the first object-side and image-side half-mirrors 152, 162, and the first object-side and image-side external reflection boundaries 154, 164. That is, an object positioned on the first side (+X direction) of the reference optical axis 16 within the cloaked region CR would be cloaked by the first object-side and image-side CR reflection boundaries 110, 120, first object-side and image-side half-mirrors 152, 162, and first object-side and image-side external reflection boundaries 154, 164. In the alternative, an object positioned on the second side (−X direction) of the reference optical axis 16 within the cloaked region CR would be cloaked by the second object-side and image-side CR reflection boundaries 130, 140, second object-side and image-side half-mirrors 172, 182, and second object-side and image-side external reflection boundaries 174, 184.

Figure 2:
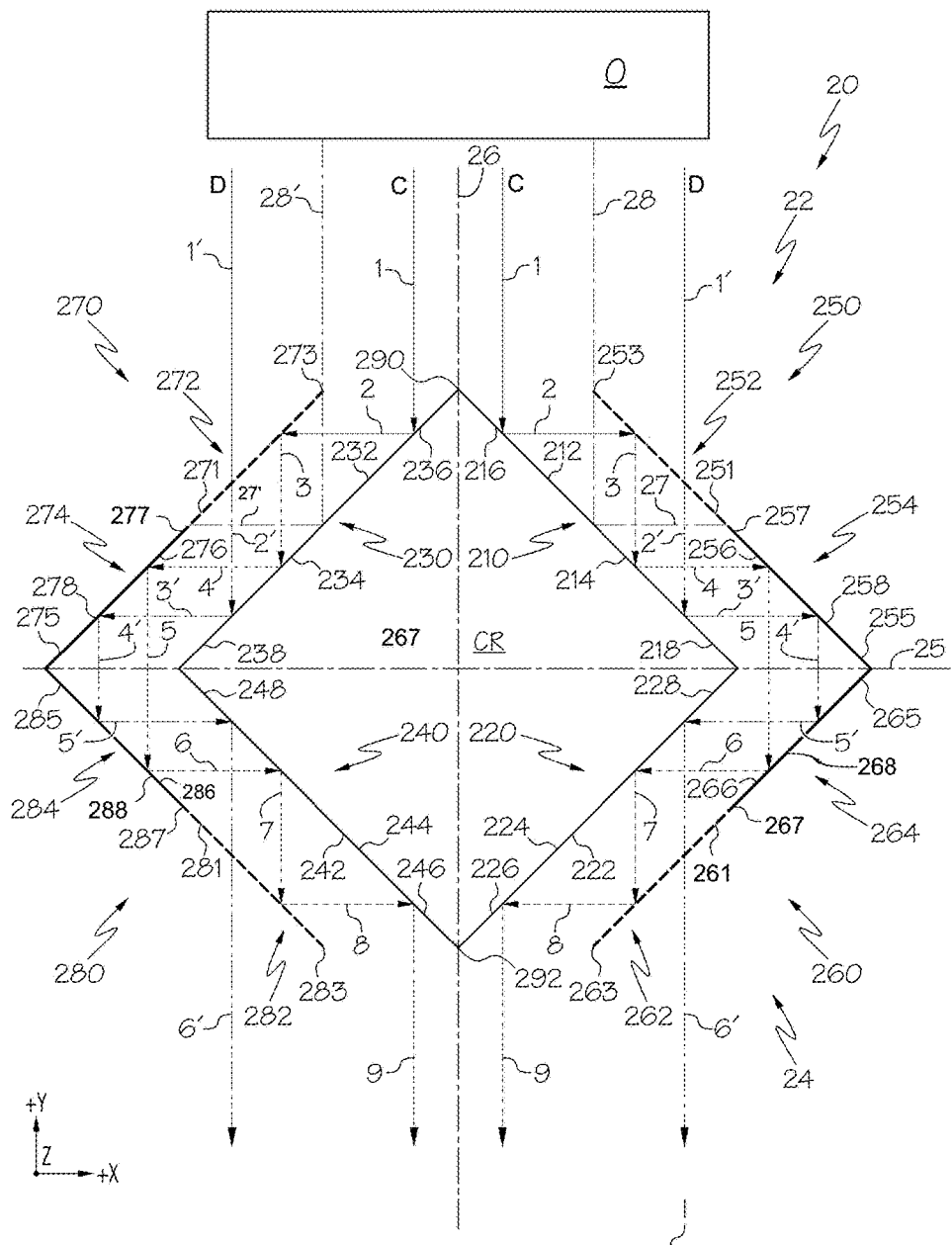
FIG. 2 schematically depicts a top view of a cloaking assembly according to one or more embodiments described and illustrated herein.

Referring now FIG. 2, embodiments of a cloaking assembly 20 with external reflection boundaries and half-mirrors positioned coplanar with each other is depicted. The cloaking assembly 20 includes an object-side 22, an image-side 24, four CR reflection boundaries 210, 220, 230, 240, and a cloaked region CR is at least partially bounded by the four CR reflection boundaries 210, 220, 230, 240. The object-side 22 is positioned above (+Y direction) a bisecting axis 25 and the image-side 24 is positioned below (−Y direction) the bisecting axis 25. That is, the bisecting axis 25 extends between and delineates the object-side 22 and the image-side 24. Each of the four CR reflection boundaries 210, 220, 230, 240 has a length along the X-axis, a width along the Y-axis and a height along the Z-axis shown in the figures. That is, the X-axis shown in the figures extends along a length of the four CR reflection boundaries 210, 220, 230, 240, the Y-axis shown in the figures extends along a width of the four CR reflection boundaries 210, 220, 230, 240, and the Z-axis shown in the figures extends along a height of the four CR reflection boundaries 210, 220, 230, 240.

The two CR reflection boundaries 210, 230 may be positioned on the object-side 22 of the cloaking assembly 20 to face an object 'O' and may be referred to herein as object-side CR reflection boundaries 210, 230. Also, the object-side CR reflection boundary 210 is positioned on a first side (+X direction) of the reference optical axis 26 and may be referred to herein as a first object-side CR reflection boundary 210 and the object-side CR reflection boundary 230 is positioned on a second side (−X direction) of the reference optical axis 26 opposite the first side and may be referred to herein as a second object-side CR reflection boundary 230. The two CR reflection boundaries 220, 240 may be positioned on the image-side 24 of the cloaking assembly 20 to provide an image 'I' formed by the cloaking assembly 20 and may be referred to herein as image-side CR reflection boundaries 220, 240. The image-side CR reflection boundary 220 is positioned on the first side (+X direction) of the reference optical axis 26 and may be referred to herein as a first image-side CR reflection boundary 220 and the image-side side CR reflection boundary 240 is positioned on the second side (−X direction) of the reference optical axis 26 opposite the first side and may be referred to herein as a second image-side CR reflection boundary 240.

The CR reflection boundaries 210, 220, 230, 240 each have an outward facing reflection surface 212, 222, 232, 242 and an inward facing surface 214, 224, 234, 244, respectively. In embodiments, one or more of the inward facing surfaces 214, 224, 234, 244 may be an opaque surface that prevents light from within the cloaked region CR from propagating through one or more of the CR reflection boundaries 210, 220, 230, 240. The outward facing reflection surfaces 212, 222, 232, 242 may be made from omni-directional photonic crystals or mirrors such that light incident on the outward facing reflection surfaces 212, 222, 232, 242 is reflected there from. In the alternative, one or more of the outward facing reflection surfaces 212, 222, 232, 242 may be a surface of a prism, e.g., a right angle prism, that totally internally reflects light incident on the surface.

The CR reflection boundaries 210, 220, 230, 240 may have an apex end 216, 226, 236, 246 and a side end 218, 228, 238, 248, respectively. The side ends 218, 228, 238, 248 are spaced apart from the apex ends 216, 226, 236, 246, respectively, and the CR reflection boundaries 210, 220, 230, 240 extend between the apex ends 216, 226, 236, 246 and the side ends 218, 228, 238, 248, respectively. In embodiments, the apex ends 216, 236 of the two object-side CR reflection boundaries 210, 230, respectively, meet or intersect at an apex 290, and in the alternative or in addition to, the apex ends 226, 246 of the two image-side CR reflection boundaries 220, 240, respectively, meet or intersect at an apex 292. In such embodiments, the reference optical axis 26 bisects the apex 290 and the apex 292, and may be a centerline between a first side (+X direction) and a second side (−X direction) of the cloaking assembly 20. In other embodiments, the apex ends 216, 236 of the two object-side CR reflection boundaries 210, 230, respectively, are spaced apart from each other and/or the apex ends 226, 246 of the two image-side CR reflection boundaries 220, 240, respectively, are spaced apart from each other such that a uncloaked region or gap (not shown) is present between the spaced apart apex ends 216, 236 and/or spaced apart apex ends 226, 246. In such embodiments, an image of the portion of the object O positioned above (+Y direction) the uncloaked region is not provided on the image-side 24 of the cloaking assembly 20. Also, in embodiments, the side end 218 may be positioned adjacent to and may be joined to side end 228 and the side end 238 may be positioned adjacent to and may be joined to side end 248 as depicted in FIG. 2. In other embodiments, the side ends 218, 238 may be spaced apart (Y direction) from the side ends 228, 248 (not shown).

In embodiments, the two object-side CR reflection boundaries 210, 230 and the two image-side CR reflection boundaries 220, 240 form the cloaked region CR that is bound at least partly by the inward facing surfaces 214, 234, 224, 244. The two object-side CR reflection boundaries 210, 230 and the two image-side CR reflection boundaries 220, 240 have a height 'h' (FIG. 5) in the Z-direction of the coordinate axes in the figures and light reflected or transmitted within the cloaked region CR does not pass through the inward facing surfaces 214, 234, 224, 244. Accordingly, an article located within the cloaked region CR (e.g., a cloaked article) is not visible to an observer viewing the cloaking assembly 20 from the image-side 24 in the +Y direction.

Still referring to FIG. 2, the cloaking assembly 20 may include four external optical component assemblies 250, 260, 270, 280 spaced apart and oriented generally parallel (within +/-2°) to each of the CR reflection boundaries 210, 220, 230, 240, respectively. In embodiments, the four external optical component assemblies 250, 260, 270, 280 may include four half-mirrors 252, 262, 272, 282 and four external reflection boundaries 254, 264, 274, 284 spaced apart and oriented generally parallel to each of the CR reflection boundaries 210, 220, 230, 240, respectively. Each of the half-mirrors 252, 262, 272, 282, and each of the four external reflection boundaries 254, 264, 274, 284, have a length along the X-axis, a width along the Y-axis and a height along the Z-axis shown in the figures. As depicted in FIG. 2, the four external reflection boundaries 254, 264, 274, 284 are coplanar with each of the four half-mirrors 252, 262, 272, 282, respectively. The two half-mirrors 252, 272 and the two external reflection boundaries 254, 274 may be positioned on the object-side 22 of the cloaking assembly 20 and may be referred to herein as object-side half-mirrors 252, 272 and object-side external reflection boundaries 254, 274, respectively. The object-side half-mirror 252 and the object-side external reflection boundary 254 are positioned on the first side (+X direction) of the reference optical axis 26 and may be referred to herein as a first object-side half-mirror 252 and a first object-side external reflection boundary 254. The object-side half-mirror 272 and the object-side external reflection boundary 274 are positioned on the second side (−X direction) of the reference optical axis 26 opposite the first side and may be referred to herein as a second object-side half-mirror 272 and a second object-side external reflection boundary 274. The two half-mirrors 262, 282 and the two external reflection boundaries 264, 284 may be positioned on the image-side 24 of the cloaking assembly 20 and may be referred to herein as image-side half-mirrors 262, 282 and image-side external reflection boundaries 264, 284, respectively. The image-side half-mirror 262 and the image-side external reflection boundary 264 are positioned on the first side (+X direction) of the reference optical axis 26 and may be referred to herein as a first image-side half-mirror 262 and a first image-side external reflection boundary 264. The image-side half-mirror 282 and the image-side external reflection boundary 284 are positioned on the second side (−X direction) of the reference optical axis 26 opposite the first side and may be referred to herein as a second image-side half-mirror 282 and a second image-side external reflection boundary 284.

The half-mirrors 252, 262, 272, 282 include a first end 251, 261, 271, 281, respectively, proximal to the bisecting axis 25 and a second end 253, 263, 273, 283, respectively, distal from the bisecting axis 25. Also, the external reflection boundaries 254, 264, 274, 284 include a first end 255, 265, 275, 285, respectively, proximal to the bisecting axis 25 and a second end 257, 267, 277, 287, respectively, distal from the bisecting axis 25. The first end 251 of the first object-side half-mirror 252 and the second end 257 of the first object-side external reflection boundary 254 may be positioned on a line 27 extending parallel to the X-axis depicted in FIG. 2. Extending from the intersection of the line 27 and the first object-side CR reflection boundary 210 in the +Y direction parallel to the Y-axis depicted in the figures is an optical path transition axis 28 discussed in greater detail below. Similarly, the first end 271 of the second object-side half-mirror 272 and the second end 277 of the second object-side external reflection boundary 274 may be positioned on a line 27' extending parallel to the X-axis depicted in FIG. 2. Extending from the intersection of the line 27' and the second object-side CR reflection boundary 230 in the +Y direction parallel to the Y-axis is an optical path transition axis 28' discussed in greater detail below. In embodiments, the line 27 and the line 27' are co-linear. In other embodiments, the line 27 and the line 27' are not co-linear.

The half-mirrors 252, 262, 272, 282 reflect a specific mode of visible light. Specifically, each of the half-mirrors 252, 262, 272, 282 may be an s-polarizer half-mirror or a p-polarizer half-mirror. The half-mirrors 252, 262, 272, 282 may be in the form of a diffraction grating or thin film polarizer that reflects the s-mode of visible light and allows the p-mode of visible light to pass through (a p-polarization diffraction grating or thin film), or in the alternative, reflects the p-mode of visible light and allows the s-mode of the visible light to pass through (an s-polarization diffraction grating or thin film). The half-mirrors 252, 262 may both be s-polarizer half-mirrors or p-polarizer half-mirrors and the half-mirrors 272, 282 may both be s-polarizer half-mirrors or p-polarizer half-mirrors, i.e. the half-mirrors 252, 262 may be s-polarizer mirrors and the half-mirrors 272, 282 may be p-polarizer half-mirrors; the half-mirrors 252, 262 may be p-polarizer mirrors and the half-mirrors 272, 282 may be s-polarizer half-mirrors; or all of the half-mirrors 252, 262, 272, 282 may be s-polarizer half-mirrors or p-polarizer half-mirrors.

Each of the external reflection boundaries 254, 264, 274, 284 has an inward facing reflection surface 256, 266, 276, 286 and an outward facing surface 258, 268, 278, 288, respectively. The inward facing reflection surfaces 256, 266, 276, 286 can be made from omnidirectional photonic crystals or mirrors such that light incident on the inward facing reflection surfaces 256, 266, 276, 286 is reflected therefrom. In the alternative, one or more of the inward facing reflection surfaces 256, 266, 276, 286 can be a surface of a prism, e.g., a right angle prism, that totally internally reflects light incident on the surface. In embodiments, one or more of the outward facing surfaces 258, 268, 278, 288 may be an opaque surface that prevents light from propagating through the external reflection boundaries 254, 264, 274, 284, respectively.

Still referring to FIG. 2, light from the object O on the first side (+X direction) of the reference optical axis 26 travels from the object-side 22 around the cloaked region CR and forms a portion of an image 'I' on the image-side 24 via two different optical paths. Particularly, light from the object positioned above (+Y direction) the cloaking assembly 20 between the reference optical axis 26 and the optical path transition axis 28 that is incident on the cloaking assembly 20 (light 1) travels from the object-side 22 around the cloaked region CR and forms a portion of an image 'I' via a first optical path 'C'. Light from the object positioned above (+Y direction) the cloaking assembly 20 between the optical path transition axis 28 and the second end 257 of the first object-side external reflection boundary 254 that is incident on the cloaking assembly 20 (light 1') travels from the object-side 22 around the cloaked region CR and forms a portion of the image I via a second optical path 'D'. Accordingly, the optical path transition axis 28 delineates a first portion on the first side (+X direction) of the cloaking assembly 20 with a first optical path (e.g., optical path C) from a second portion on the first side (+X direction) of the cloaking assembly 20 with a second optical path (e.g., optical path D).

Regarding the first optical path C on the first side (+X direction) of the reference optical axis 26, the first object-side CR reflection boundary 210 is positioned relative to the first object-side external reflection boundary 254 such that light 1 from the object O is reflected by the outward facing reflection surface 212 of the first object-side CR reflection boundary 210 onto the first object-side half-mirror 252 as light 2. Light 2 is polarized by the first object-side half-mirror 252 such that one mode of light 2 is reflected by the first object-side half-mirror 252 and another mode of light 2 is transmitted through the first object-side half-mirror 252. A non-limiting example of the first object-side half-mirror 252 in the form of a p-polarization half-mirror is depicted in FIG. 2. Accordingly, s-polarized light is reflected by the first object-side half-mirror 252 as light 3. The first object-side half-mirror 252 is positioned relative to the first object-side CR reflection boundary 210 such that light 3 is reflected by the first object-side half-mirror 252 onto the first object-side CR reflection boundary 210 where it is reflected by the outward facing reflection surface 212 as light 4. The first object-side CR reflection boundary 210 is positioned relative to the first object-side external reflection boundary 254 such that light 4 is reflected by the outward facing reflection surface 212 onto the inward facing reflection surface 256 where it is reflected as light 5. The first object-side external reflection boundary 254 is positioned relative to the first image-side external reflection boundary 264 such that light 5 is reflected by the inward facing reflection surface 256 onto the inward facing reflection surface 266 where it is reflected as light 6. The first image-side external reflection boundary 264 is positioned relative to the first image-side CR reflection boundary 220 such that light 6 is reflected by the inward facing reflection surface 266 onto the outward facing reflection surface 222 where it is reflected as light 7. The first image-side CR reflection boundary 220 is positioned relative to the first image-side half-mirror 262 such that light 7 is reflected by the outward facing reflection surface 222 onto the first image-side half-mirror 262 where it is reflected as light 8. The first image-side half-mirror 262 is positioned relative to the first image-side CR reflection boundary 220 such that light 8 is reflected by the first image-side half-mirror 262 onto the outward facing reflection surface 222 where it is reflected as light 9 generally parallel to light 1 and forms a portion of the image I on the image-side 24 of the cloaking assembly 20. It should be understood that the portion of the image I formed by light that travels from the object-side 22 around the cloaked region CR via the first optical path C on the first side (+X direction) of the reference optical axis 26 corresponds to the portion of the object O positioned above (+Y direction) the cloaking assembly 20 between the reference optical axis 26 and the optical path transition axis 28.

Accordingly, light from the object O may travel from the object-side 22 to the image-side 24 via the first optical path C: object O—first object-side CR reflection boundary 210—first object-side half-mirror 252—first object-side CR reflection boundary 210—first object-side external reflection boundary 254—first image-side external reflection boundary 264—first image-side CR reflection boundary 220—first image-side half-mirror 262—first image-side CR reflection boundary 220—image I. That is, light from the object O may travel from the object-side 22 to the image-side 24 via the first optical path C: object O—reflection from the outward facing reflection surface 212 of the first object-side CR reflection boundary 210—reflection from the first object-side half-mirror 252—reflection from the outward facing reflection surface 212 of the first object-side CR reflection boundary 210—reflection from the inward facing reflection surface 256 of the first object-side external reflection boundary 254—reflection from the inward facing reflection surface 266 of the first image-side external reflection boundary 264—reflection from the outward facing reflection surface 222 of the first image-side CR reflection boundary 220—reflection from the first image-side half-mirror 262—reflection from the outward facing reflection surface 222 of the first image-side CR reflection boundary 220—image I.

Regarding the second optical path D on the first side (+X direction) of the reference optical axis 26, light 1' from the object O is incident on and polarized by the first object-side half-mirror 252 such that one mode of light 1' is transmitted through the first object-side half-mirror 252 and another mode of light 1' is reflected by the first object-side half-mirror 252. As noted above, a non-limiting example of the first object-side half-mirror 252 in the form of a p-polarization half-mirror is depicted in FIG. 2. Accordingly, p-polarized light (shown as double-dashed center lines in the figures in contrast to single-dashed center lines for the bisecting axis 25 and the reference optical axis 26) is transmitted through the first object-side half-mirror 252 as light 2'. The first object-side half-mirror 252 is positioned relative to the first object-side CR reflection boundary 210 such that light 2' transmitted through the first object-side half-mirror 252 is incident on the first object-side CR reflection boundary 210 where it is reflected by the outward facing reflection surface 212 as light 3'. The first object-side CR reflection boundary 210 is positioned relative to the first object-side external reflection boundary 254 such that light 3' reflected by the outward facing reflection surface 212 is incident on the inward facing reflection surface 256 where it is reflected as light 4'. The first object-side external reflection boundary 254 is positioned relative to the first image-side external reflection boundary 264 such that light 4' reflected by the inward facing reflection surface 256 is incident on the inward facing reflection surface 266 where it is reflected as light 5'. The first image-side external reflection boundary 264 is positioned relative to the first image-side CR reflection boundary 220 such that light 5' reflected by the inward facing reflection surface 266 is incident on the outward facing reflection surface 222 where it is reflected as light 6' generally parallel to light 1'. The first image-side CR reflection boundary 220 is positioned relative to the first image-side half-mirror 262 such that light 6' reflected by the outward facing reflection surface 222 is incident on the first image-side half-mirror 262. As noted above, the first-image-side half-mirror 262 is the same type of half-mirror as the first object-side half-mirror 252. Accordingly, light 6' is transmitted through the first image-side half-mirror 262 (as light 6') and forms a portion of the image I on the image-side 24 of the cloaking assembly 20. It should be understood that the portion of the image I formed by light that travels from the object-side 22 around the cloaked region CR via the second optical path D on the first side (+X direction) of the reference optical axis 26 corresponds to the portion of the object O positioned above (+Y direction) the cloaking assembly 20 between the optical path transition axis 28 and the second end 257 of the first object-side external reflection boundary 254.

Accordingly, light from the object O may travel from the object-side 22 to the image-side 24 via the second optical path D: object O—first object-side half-mirror 252—first object-side CR reflection boundary 210—first object-side external reflection boundary 254—first image-side external reflection boundary 264—first image-side CR reflection boundary 220 —first image-side half-mirror 262—image I. That is, light from the object O may travel from the object-side 22 to the image-side 24 via the second optical path D: object O—transmittance through the first object-side half-mirror 252—reflection from the outward facing reflection surface 212 of the first object-side CR reflection boundary 210—reflection from the inward facing reflection surface 256 of the first object-side external reflection boundary 254—reflection from the inward facing reflection surface 266 of the first image-side external reflection boundary 264—reflection from the outward facing reflection surface 222 of the first image-side CR reflection boundary 220—transmittance through the first image-side half-mirror 262—image I.

Still referring to FIG. 2, light from the object O on the second side (−X direction) of the reference optical axis 26 travels from the object-side 22 around the cloaked region CR and forms a portion of an image 'I' on the image-side 24 via the two different optical paths C and D. Particularly, light from the object positioned above (+Y direction) the cloaking assembly 20 between the reference optical axis 26 and the optical path transition axis 28' that is incident on the cloaking assembly 20 (light 1) travels from the object-side 22 around the cloaked region CR and forms a portion of an image 'I' via the first optical path C. Light from the object positioned above (+Y direction) the cloaking assembly 20 between the optical path transition axis 28' and the second end 277 of the second object-side external reflection boundary 274 that is incident on the cloaking assembly 20 (light 1') travels from the object-side 22 around the cloaked region CR and forms a portion of the image I via the second optical path D.

Regarding the first optical path C on the second side (−X direction) of the reference optical axis 26, the second object-side CR reflection boundary 230 is positioned relative to the second object-side half-mirror 272 such that light 1 is reflected by the outward facing reflection surface 232 of the second object-side CR reflection boundary 230 onto the second object-side half-mirror 272 as light 2. Light 2 is polarized by the second object-side half-mirror 272 such that one mode of light 2 is reflected by the second object-side half-mirror 272 and another mode of light 2 is transmitted through the second object-side half-mirror 272. A non-limiting example of the second object-side half-mirror 272 in the form of a p-polarization half-mirror is depicted in FIG. 2. Accordingly, s-polarized light is reflected by the second object-side half-mirror 272 as light 3. The second object-side half-mirror 272 is positioned relative to the second object-side CR reflection boundary 230 such that light 3 reflected by the second object-side half-mirror 272 is incident on the second object-side CR reflection boundary 230 where it is reflected by the outward facing reflection surface 232 as light 4. The second object-side CR reflection boundary 230 is positioned relative to the second object-side external reflection boundary 274 such that light 4 reflected by the outward facing reflection surface 232 is incident on the inward facing reflection surface 276 where it is reflected as light 5. The second object-side external reflection boundary 274 is positioned relative to the second image-side external reflection boundary 284 such that light 5 reflected by the inward facing reflection surface 276 is incident on the inward facing reflection surface 286 where it is reflected as light 6. The second image-side external reflection boundary 284 is positioned relative to the second image-side CR reflection boundary 240 such that light 6 reflected by the inward facing reflection surface 286 is incident on the outward facing reflection surface 242 where it is reflected as light 7. The second image-side CR reflection boundary 240 is positioned relative to the second image-side half-mirror 282 such that light 7 reflected by the outward facing reflection surface 242 is incident on the second image-side half-mirror 282 where it is reflected as light 8. The second image-side half-mirror 282 is positioned relative to the second image-side CR reflection boundary 240 such that light 8 reflected by the second image-side half-mirror 282 is incident on the outward facing reflection surface 242 where it is reflected as light 9 generally parallel to light 1 and forms a portion of the image I on the image-side 24 of the cloaking assembly 20. It should be understood that the portion of the image I formed by light that travels from the object-side 22 around the cloaked region CR via the first optical path C on the second side (−X direction) corresponds to the portion of the object O positioned above (+Y direction) the cloaking assembly 20 between the reference optical axis 26 and the optical path transition axis 28'.

Accordingly, light from the object O may travel from the object-side 22 to the image-side 24 via the first optical path C: object O—second object-side CR reflection boundary 230—second object-side half-mirror 272—second object-side CR reflection boundary 230—second object-side external reflection boundary 274—second image-side external reflection boundary 284—second image-side CR reflection boundary 240—second image-side half-mirror 282—second image-side CR reflection boundary 240—image I. That is, light from the object O may travel from the object-side 22 to the image-side 24 via the first optical path C: object O—reflection from the outward facing reflection surface 232 of the second object-side CR reflection boundary 230— reflection from the second object-side half-mirror 272— reflection from the outward facing reflection surface 232 of the second object-side CR reflection boundary 230—reflection from the inward facing reflection surface 276 of the second object-side external reflection boundary 274—reflection from the inward facing reflection surface 286 of the second image-side external reflection boundary 284—reflection from the outward facing reflection surface 242 of the second image-side CR reflection boundary 240—reflection from the second image-side half-mirror 282—reflection from the outward facing reflection surface 242 of the second image-side CR reflection boundary 240—image I.

Regarding the second optical path D on the second side (−X direction) of the reference optical axis 26, light 1' from the object 0 is incident on and polarized by the second object-side half-mirror 272 such that one mode of light 1' is transmitted through the second object-side half-mirror 272 and another mode of light 1' is reflected by the second object-side half-mirror 272. As noted above, a non-limiting example of the second object-side half-mirror 272 in the form of a p-polarization half-mirror is depicted in FIG. 2. Accordingly, p-polarized light is transmitted through the second object-side half-mirror 272 as light 2'. The second object-side half-mirror 272 is positioned relative to the second object-side CR reflection boundary 230 such that light 2' transmitted through the second object-side half-mirror 272 is incident on the second object-side CR reflection boundary 230 where it is reflected by the outward facing reflection surface 232 as light 3'. The second object-side CR reflection boundary 230 is positioned relative to the second object-side external reflection boundary 274 such that light 3' reflected by the outward facing reflection surface 232 is incident on the inward facing reflection surface 276 where it is reflected as light 4'. The second object-side external reflection boundary 274 is positioned relative to the second image-side external reflection boundary 284 such that light 4' reflected by the inward facing reflection surface 276 is incident on the inward facing reflection surface 286 where it is reflected as light 5'. The second image-side external reflection boundary 284 is positioned relative to the second image-side CR reflection boundary 240 such that light 5' reflected by the inward facing reflection surface 286 is incident on the outward facing reflection surface 242 where it is reflected as light 6' generally parallel to light 1'. The second image-side CR reflection boundary 240 is positioned relative to the second image-side half-mirror 282 such that light 6' reflected by the outward facing reflection surface 242 is incident on the second image-side half-mirror 282. As noted above, the second image-side half-mirror 282 is the same type of half-mirror as the second object-side half-mirror 272. Accordingly, light 6' is transmitted through the second image-side half-mirror 282 (as light 6') and forms a portion of the image I on the image-side 24 of the cloaking assembly 20. It should be understood that the portion of the image I formed by light that travels from the object-side 22 around the cloaked region CR via the second optical path D on the second side (−X direction) of the reference optical axis 26 corresponds to the portion of the object O positioned above (+Y direction) the cloaking assembly 20 between the optical path transition axis 28' and the second end 277 of the second object-side external reflection boundary 274.

Accordingly, light from the object O may travel from the object-side 22 to the image-side 24 via the second optical path D: object O—second object-side half-mirror 272—second object-side CR reflection boundary 230—second object-side external reflection boundary 274—second image-side external reflection boundary 284—second image-side CR reflection boundary 240—second image-side half-mirror 282—image I. That is, light from the object O may travel from the object-side 22 to the image-side 24 via the second optical path D: object O—transmittance through the second object-side half-mirror 272—reflection from the outward facing reflection surface 232 of the second object-side CR reflection boundary 230—reflection from the inward facing reflection surface 276 of the second object-side external reflection boundary 274—reflection from the inward facing reflection surface 286 of the second image-side external reflection boundary 284—reflection from the outward facing reflection surface 242 of the second image-side CR reflection boundary 240—transmittance through the second image-side half-mirror 282—image I.

In combination, i.e., light 1 on the first side (+X direction) and the second side (−X direction) of the reference optical axis 26 from the object O on the object-side 22 of the cloaking assembly 20 propagates to the image-side 24 via the first optical paths C: object O—reflection from the outward facing reflection surfaces 212, 232 of the first and second object-side CR reflection boundaries 210, 230, respectively—reflection from the first and second object-side half-mirrors 252, 272—reflection from the outward facing reflection surfaces 212, 232 of the first and second object-side CR reflection boundaries 210, 230, respectively—reflection from the inward facing reflection surfaces 256, 276 of the first and second object-side external reflection boundaries 254, 274, respectively—reflection from the inward facing reflection surfaces 266, 286 of the first and second image-side external reflection boundaries 264, 284, respectively—reflection from the outward facing reflection surfaces 222, 242 of the first and second image-side CR reflection boundaries 220, 240, respectively—reflection from the first and second image-side half-mirrors 262, 282—reflection from the outward facing reflection surfaces 222, 242 of the first and second image-side CR reflection boundaries 220, 240, respectively—image I. Also, light 1' on the first side (+X direction) and the second side (−X direction) of the reference optical axis 26 from the object O on the object-side 22 of the cloaking assembly 20 propagates to the image-side 24 via the second optical paths D: object O—transmittance through the first and second object-side half-mirrors 252, 272—reflection from the outward facing reflection surfaces 212, 232 of the first and second object-side CR reflection boundaries 210, 230, respectively—reflection from the inward facing reflection surfaces 256, 276 of the first and second object-side external reflection boundaries 254, 274, respectively—reflection from the inward facing reflection surfaces 266, 286 of the first and second image-side external reflection boundaries 264, 284, respectively—reflection from the outward facing reflection surfaces 222, 242 of the first and second image-side CR reflection boundaries 220, 240, respectively—transmittance through the first and second image-side half-mirrors 262, 282—image I.

While FIG. 2 depicts the CR reflection boundaries 210, 220, 230, 240, the half-mirrors 252, 262, 272, 282, and the external reflection boundaries 254, 264, 274, 284 as stand-alone components, it should be understood that the CR reflection boundaries 210, 220, 230, 240 and the external optical component assemblies 250, 260, 270, 280 may be provided as a single unit or a plurality of assembled units. For example, the external optical component assemblies 250, 260, 270, 280 may be formed from a plurality of prisms that comprise the CR reflection boundaries 210, 220, 230, 240, the half-mirrors 252, 262, 272, 282, and the external reflection boundaries 254, 264, 274, 284. It should also be understood that the cloaking assembly 20 may cloak an object within the cloaked region CR including only the first object-side and image-side CR reflection boundaries 210, 220, the first object-side and image-side half-mirrors 252, 262, and the first object-side and image-side external reflection boundaries 254, 264. That is, an object positioned on the first side (+X direction) of the reference optical axis 26 within the cloaked region CR would be cloaked by the first object-side and image-side CR reflection boundaries 210, 220, first object-side and image-side half-mirrors 252, 262, and first object-side and image-side external reflection boundaries 254, 264. In the alternative, an object positioned on the second side (−X direction) of the reference optical axis 26 within the cloaked region CR would be cloaked by the second object-side and image-side CR reflection boundaries 230, 240, second object-side and image-side half-mirrors 272, 282, and second object-side and image-side external reflection boundaries 274, 284.

Figure 3:
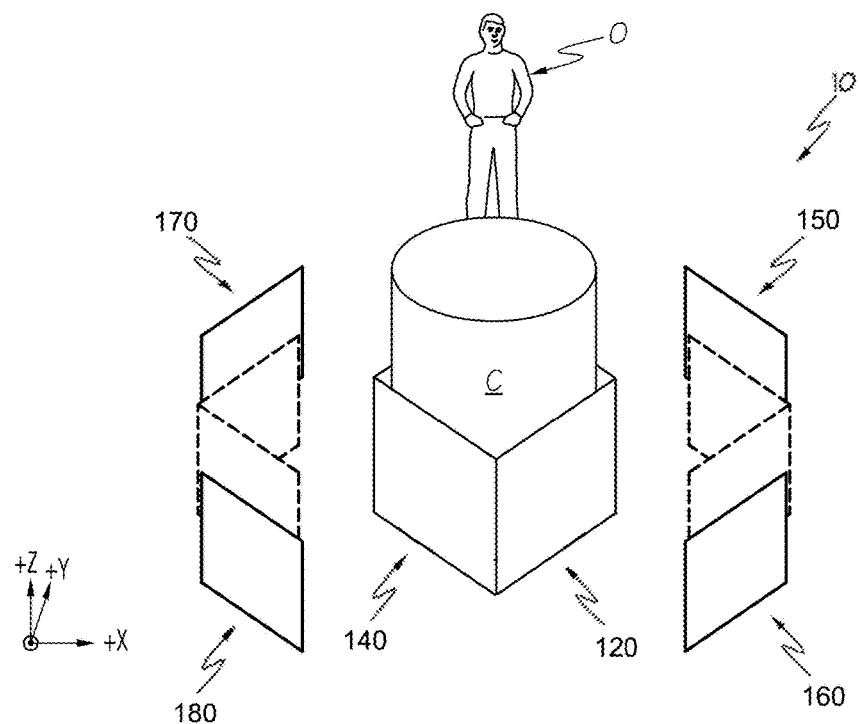
FIG. 3 schematically depicts a top perspective view of the cloaking assembly of FIG. 1 with a first object on one side of the cloaking device and a second object within a cloaked region of the cloaking device.
Figure 4:
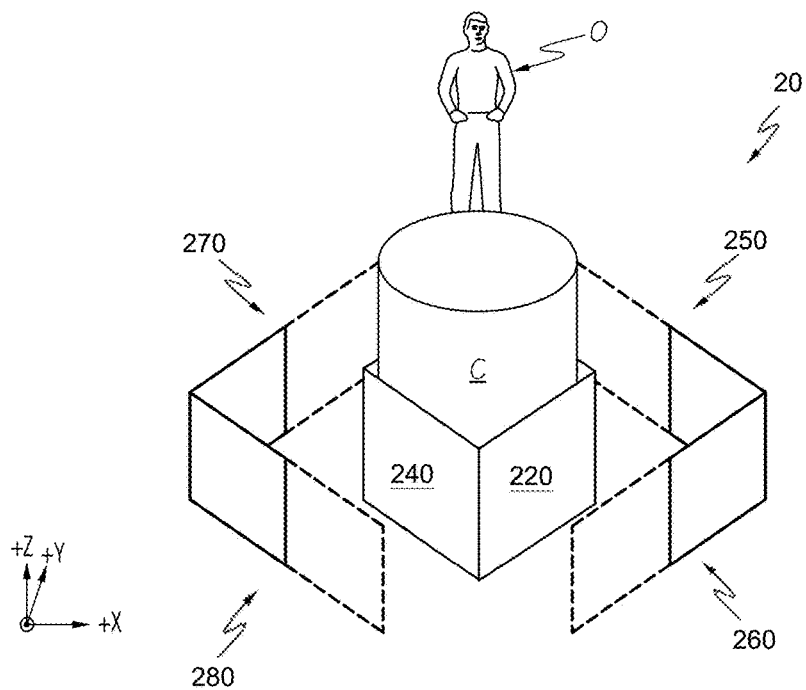
FIG. 4 schematically depicts a top perspective view of the cloaking assembly of FIG. 2 with a first object on one side of the cloaking device and a second object within a cloaked region of the cloaking device.
Figure 5:
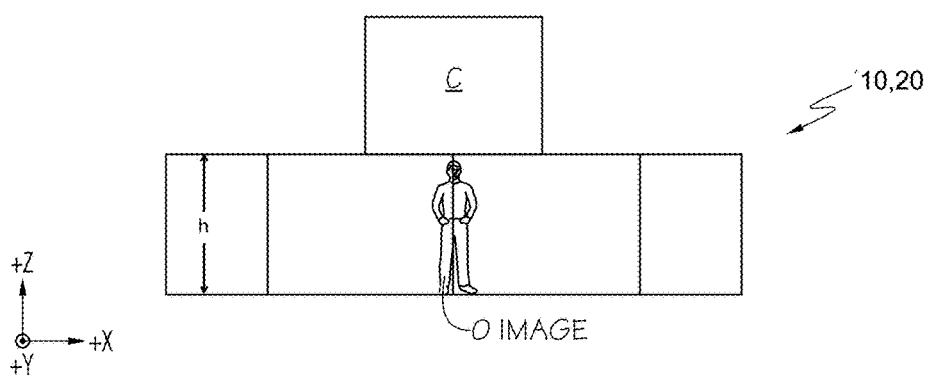
FIG. 5 schematically depicts a side view of the cloaking assemblies of FIGS. 3 and 4 with the first object on one side of the cloaking device and the second object within the cloaked region of the cloaking device.

Referring now to FIGS. 1-5, top perspective views and a side view of cloaking devices according to embodiments described herein are shown in FIGS. 3-5. Particularly, FIG. 3 is a top perspective view of an article in the form of a column 'C' within the cloaked region CR of the cloaking assembly 10 (FIG. 1) and an object 'O' (e.g., a person) located behind the column C on the object-side 12 of the cloaking assembly 10 in the +Y direction. The column C has a height dimension in the Z direction (increasing height in the +Z direction) greater than the height h of the cloaking device (FIG. 5). FIG. 4 is a top perspective view of the column C within the cloaked region CR of the cloaking assembly 20 (FIG. 2) and the object O located behind the column C on the object-side 22 of the cloaking assembly 20 in the +Y direction. FIG. 5 is a side view from the +Y direction of the cloaking assemblies 10, 20 shown in FIGS. 3 and 4 and shows the portion of the column C that is within the cloaked region CR is not visible and the object O located behind the column C in the +Y direction is visible to an observer viewing the cloaking assembly 10 in the +Y direction. Accordingly, the column C positioned within the cloaked region CR is not visible to an observer viewing the image-sides 14, 24 of the cloaking assemblies 10, 20, respectively, and an image of the object O is visible to the observer viewing the image-sides 14, 24. Although column C in FIGS. 3-5 is separate from the inward facing surfaces 114, 124, 134, 144 (FIG. 3) and the inward facing surfaces 214, 224, 234, 244 (FIG. 4) i.e., column C is a separate object from the cloaking assemblies 10, 20, it should be appreciated that column C may be structurally part of the cloaking assembly 10 and/or cloaking assembly 20 and have an outer surface that provides or is equivalent to the inward facing surfaces 114, 124, 134, 144 (FIG. 1) and and/or the inward facing surfaces 214, 224, 234, 244 (FIG. 2).

Figure 6:
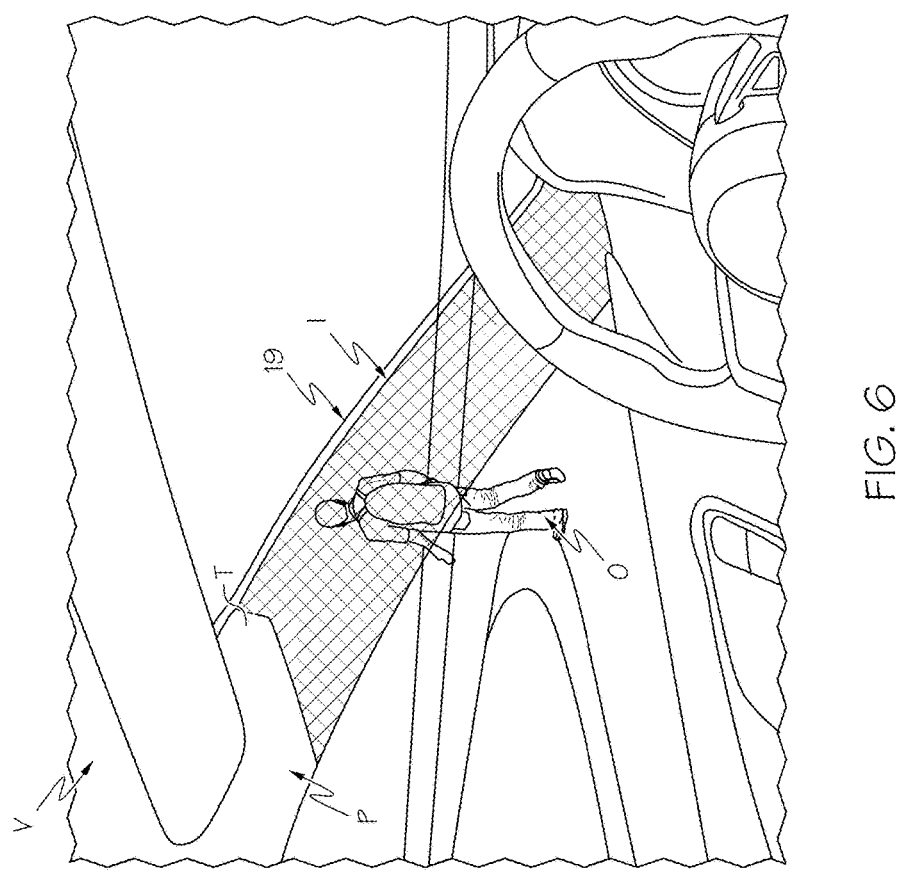
FIG. 6 schematically depicts a side view of a cloaking assembly cloaking an A-pillar of a vehicle according to one or more embodiments described and illustrated herein.

Referring to FIG. 6, embodiments of an A-pillar of a vehicle being cloaked by a cloaking device are shown. Particularly, FIG. 6 shows a cloaking device 19 cloaking a portion of an A-pillar P of a vehicle V. A portion of the A-pillar P is positioned within a cloaked region (not shown) of the cloaking device 19 and a portion of the A-pillar P extends beyond the cloaking device and is covered with trim T. Illustrated outside of the vehicle V is a target object O in the form of pedestrian. A portion of the pedestrian O is visible through a side window of the vehicle V and a portion of the pedestrian is visible "through" the A-pillar P cloaked by the cloaking device 19. The cloaking device 19 redirects light reflected from the pedestrian O around the A-pillar P positioned within the cloaked region of the cloaking device 19 and forms an image I of the pedestrian O on an image-side of the cloaking device 19 that is visible to an occupant of the vehicle V looking towards the pedestrian O. Accordingly, light from the pedestrian O appears to pass through the A-pillar P and a blind spot typically created by the A-pillar P is not as present as when the portion of the A-pillar P is not positioned within the cloaked region of the cloaking device 19. It should be appreciated that cloaking of the A-pillar P with the cloaking device 19 and removing the blind spot produced by the A-pillar P is performed without the use of metamaterials, video images, cameras, sophisticated electronics, etc.

EXAMPLES

Figure 7C:
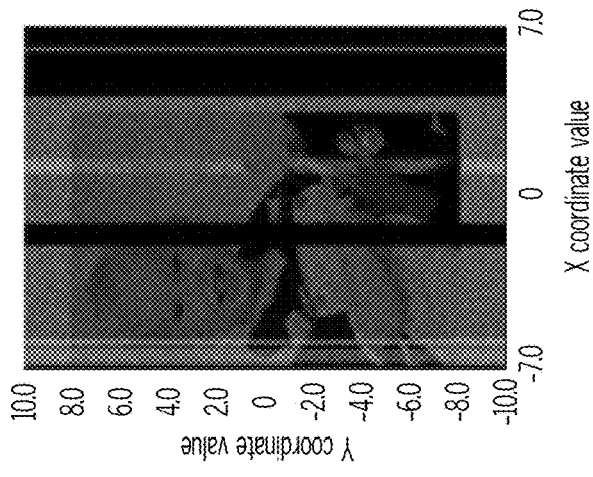
FIG. 7C depicts a computer simulated cloaking image for a cloaking assembly according to FIG. 1 with a 2° misalignment between a reference optical axis and a viewing angle of the cloaking assembly.
Figure 7B:
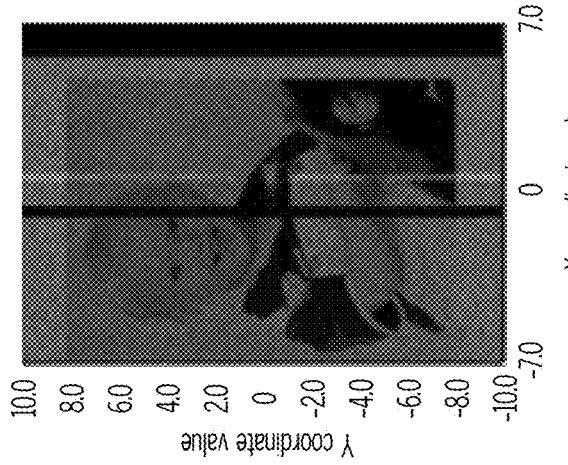
FIG. 7B depicts a computer simulated cloaking image for a cloaking assembly according to FIG. 1 with a 1° misalignment between a reference optical axis and a viewing angle of the cloaking assembly.
Figure 7A:
FIG. 7A depicts a computer simulated cloaking image for a cloaking assembly according to FIG. 1 with a 0° misalignment between a reference optical axis and a viewing angle of the cloaking assembly.
Figure 7E:
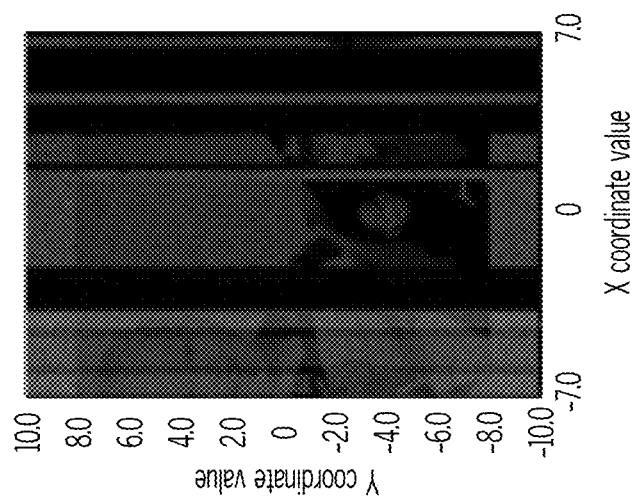
FIG. 7E depicts a computer simulated cloaking image for a cloaking assembly according to FIG. 1 with a 4° misalignment between a reference optical axis and a viewing angle of the cloaking assembly.
Figure 7D:
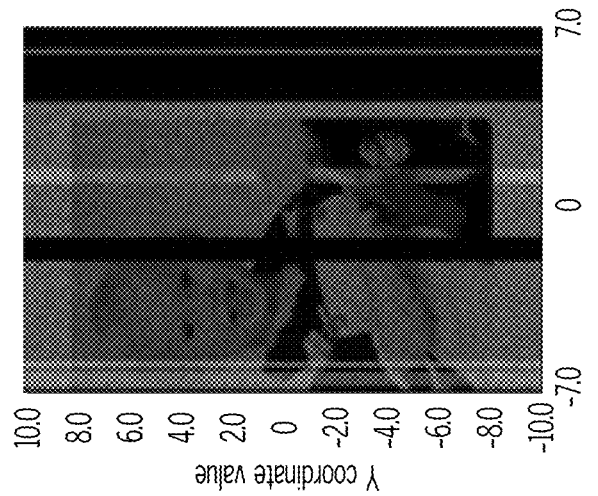
FIG. 7D depicts a computer simulated cloaking image for a cloaking assembly according to FIG. 1 with a 3° misalignment between a reference optical axis and a viewing angle of the cloaking assembly.

Referring now to FIGS. 7A-7E, images of an object in the form of a photograph positioned on the object-side 12 of the cloaking assembly 10 and as viewed from the image-side 14 simulated using a commercial software program (Zemax OpticStudio) are depicted. The cloaking assembly 10 with the four CR reflection boundaries 110, 120, 130, 140, four half-mirrors 152, 162, 172, 182, and four external reflection boundaries 154, 164, 174, 184, were provided in the form of four N-BK7 right angle prisms with 50 mm length sides (#32-535, Edmund Optics), four N-BK7 right angle prisms with 25 mm length sides (#32-336, Edmund Optics), and four wire-grid polarizer—cube beamsplitters (WGP-CBS) (#89-604 Edmund Optics). The outward facing reflection surfaces 112, 122, 132, 142 and the inward facing reflection surfaces 156, 166, 176, 186 were provided by total internal reflection within the right angle prims and the half-mirrors 152, 162, 172,182 were provided by the WGP-CBS. The cloaking assembly had a cloaking ratio of about 36%. FIG. 7A depicts an image of the object with no misalignment)(0°) between the reference optical axis 16 and a viewing angle of the cloaking assembly 10. That is, as used herein, the term misalignment refers to an angle defined by the reference optical axis of a cloaking assembly and a line of sight of an observer viewing the cloaking assembly from the image-side as depicted by the +Y direction in the figures (also referred to herein as a "viewing angle"). FIG. 7B depicts an image of the object with a 1° misalignment between the reference optical axis 16 and a viewing angle of the cloaking assembly 10. FIG. 7C depicts an image of the object with a 2° misalignment between the reference optical axis 16 and a viewing angle of the cloaking assembly 10. FIG. 7D depicts an image of the object with a 3° misalignment between the reference optical axis 16 and a viewing angle of the cloaking assembly 10. FIG. 7E depicts an image of the object with a 4° misalignment between the reference optical axis 16 and a viewing angle of the cloaking assembly 10. As shown by the images in FIGS. 7A-7E, an image of the object on the object-side 12 of the cloaking assembly 10 can be seen clearly with up to 3° of misalignment and is still visible with up to 4° of misalignment. Accordingly, an observer can view or "see" the object O through the cloaked region CR even if the observer is not looking directly along the reference optical axis 16 of the cloaking assembly 10.

Figure 8A:
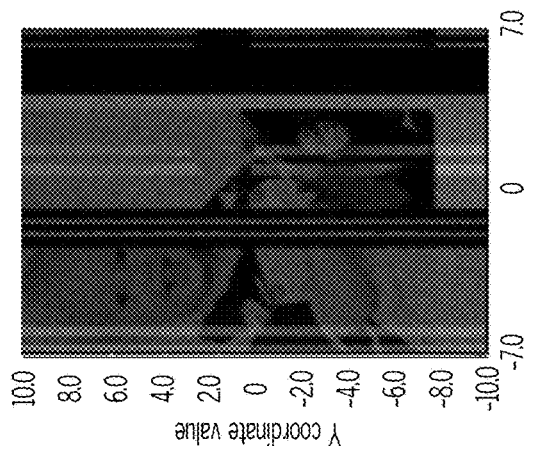
FIG. 8A depicts a computer simulated cloaking image for a cloaking assembly according to FIG. 2 with a 0° misalignment between a reference optical axis and a viewing angle of the cloaking assembly.
Figure 8B:
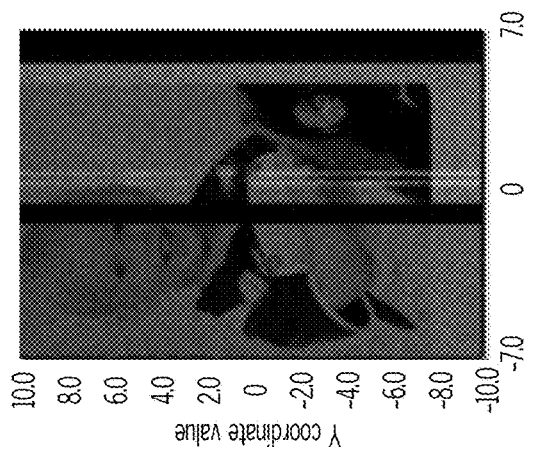
FIG. 8B depicts a computer simulated cloaking image for a cloaking assembly according to FIG. 2 with a 1° misalignment between a reference optical axis and a viewing angle of the cloaking assembly.
Figure 8C:
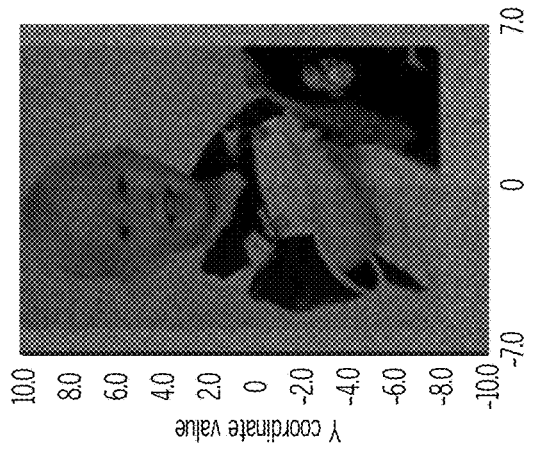
FIG. 8C depicts a computer simulated cloaking image for a cloaking assembly according to FIG. 2 with a 2° misalignment between a reference optical axis and a viewing angle of the cloaking assembly.
Figures 8D, 8E:
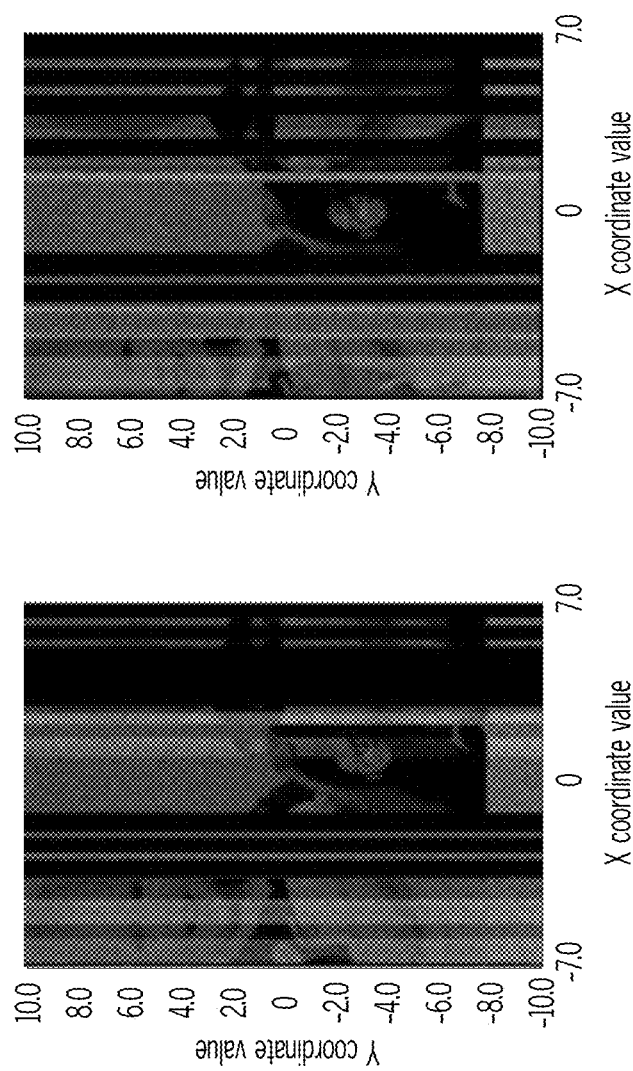
FIG. 8D depicts a computer simulated cloaking image for a cloaking assembly according to FIG. 2 with a 3° misalignment between a reference optical axis and a viewing angle of the cloaking assembly.
FIG. 8E depicts a computer simulated cloaking image for a cloaking assembly according to FIG. 2 with a 4° misalignment between a reference optical axis and a viewing angle of the cloaking assembly.

Referring now to FIGS. 8A-8E, images of an object in the form of a photograph positioned on the object-side 22 of the cloaking assembly 20 and as viewed from the image-side 24 simulated using a commercial software program (Zemax OpticStudio) are depicted. The cloaking assembly 20 with the four CR reflection boundaries 210, 220, 230, 240, four half-mirrors 252, 262, 272, 282, and four external reflection boundaries 254, 264, 274, 284, were provided in the form of twelve N-BK7 right angle prisms with 25 mm length sides (#32-336, Edmund Optics) and four WGP-CBS (190 89-604 Edmund Optics). The outward facing reflection surfaces 212, 222, 232, 242 and the inward facing reflection surfaces 256, 266, 276, 286 were provided by total internal reflection within the right angle prims and the half-mirrors 252, 262, 272, 282 were provided by the WGP-CBS. The cloaking assembly 20 had a cloaking ratio of about 44%; however, a cloaking ratio of 50% can be achieved by replacing the right angle prisms with plane mirrors. FIG. 8A depicts an image of the object with no misalignment)(0° between the reference optical axis 26 and a viewing angle of the cloaking assembly 20. FIG. 8B depicts an image of the object with a 1° misalignment between the reference optical axis 26 and a viewing angle of the cloaking assembly 20. FIG. 8C depicts an image of the object with a 2° misalignment between the reference optical axis 26 and a viewing angle of the cloaking assembly 20. FIG. 8D depicts an image of the object with a 3° misalignment between the reference optical axis 26 and a viewing angle of the cloaking assembly 20. FIG. 8E depicts an image of the object with a 4° misalignment between the reference optical axis 26 and a viewing angle of the cloaking assembly 20. As shown by the images in FIGS. 8A-8E, an image of the object on the object-side 22 of the cloaking assembly 20 can be seen clearly with up to 2° of misalignment and is still visible with up to 3° of misalignment. Accordingly, an observer can view or "see" the object O through the cloaked region CR even if the observer is not looking directly along the reference optical axis 26 of the cloaking assembly 20.

The cloaking devices described herein may be used to cloak vehicle articles such as a vehicle A-pillar, B-pillar, C-pillar, D-pillar, etc., and remove a blind spot caused by the vehicle article. Also, the cloaking devices described herein may be used to cloak articles such as extension cords, electrical conduit, piping, etc., in home, office and industrial environments. The terms "object," "article," and "item" may interchangeably refer to a visual object or image (2D or 3D) that reflects light or transmits light and the term "light from" may refer to "light reflected from" or "light transmitted from." The terms "generally" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
an object-side, an image-side, and a cloaked region (CR) between the object-side and the image-side;
an object-side CR reflection boundary, an object-side half-mirror, and an object-side external reflection boundary, wherein the object-side half-mirror and the object-side external reflection boundary are spaced apart and generally parallel to the object-side CR reflection boundary; and
an image-side CR reflection boundary, an image-side half-mirror, and an image-side external reflection boundary, wherein the image-side half-mirror and the image-side external reflection boundary are spaced apart and generally parallel to the image-side CR reflection boundary;
wherein light from an object located on the object-side of the cloaking device and obscured by the CR is redirected around the CR via two optical paths to form an image of the object on the image-side of the cloaking device such that the light from the object appears to pass through the CR.

2. The cloaking device of claim 1, wherein:
light from the object on the object-side of the cloaking device redirected around the CR to form the image of the object on the image-side of the cloaking device propagates via a first optical path and a second optical path that is different than the first optical path;
light propagating via the first optical path is reflected by the object-side half-mirror and the image-side half-mirror; and
light propagating via the second optical path is transmitted through the object-side half-mirror and the image-side half-mirror.

3. The cloaking device of claim 1, wherein:
the object-side external reflection boundary is spaced apart and generally parallel to the object-side half-mirror;
the image-side external reflection boundary is spaced apart and generally parallel to the image-side half-mirror; and
the object-side half-mirror and the image-side half-mirror are positioned between the object-side external reflection boundary and the image-side external reflection boundary.

4. The cloaking device of claim 3, wherein the two optical paths comprise:
a first optical path extending from the Object to the object-side CR reflection boundary; thereafter extending to the object-side external reflection boundary; thereafter extending to the object-side half-mirror; thereafter extending to the image-side half-mirror; thereafter extending to the image-side external reflection boundary; thereafter extending to the image-side CR reflection boundary; thereafter extending to the Image; and
a second optical path extending from the Object to the object-side CR reflection boundary; thereafter extending to the object-side half-mirror; thereafter extending to the image-side half-mirror; thereafter extending to the image-side CR reflection boundary; thereafter extending to the Image.

5. The cloaking device of claim 3, wherein the two optical paths comprise:
a first optical path beginning at the Object; reflecting from the object-side CR reflection boundary; thereafter reflecting from the object-side external reflection boundary; thereafter transmitting through the object-side half-mirror; thereafter transmitting through the image-side half-mirror thereafter reflecting from the image-side external reflection boundary; thereafter reflecting from the image-side CR reflection boundary; thereafter extending to the Image; and
a second optical path beginning at the Object; reflecting from the object-side CR reflection boundary; thereafter reflecting from the object-side half-mirror; thereafter reflecting from the image-side half-mirror; thereafter reflecting from the image-side CR reflection boundary; thereafter extending to the Image.

6. The cloaking device of claim 3, wherein:
the object-side external reflection boundary is coplanar with the object-side half-mirror; and
the image-side external reflection boundary is coplanar with the image-side half-mirror.

7. The cloaking device of claim 6, wherein the two optical paths comprise:
- a first optical path extending from the Object to the object-side CR reflection boundary; thereafter extending to the object-side half-mirror; thereafter extending to the object-side CR reflection boundary; thereafter extending to the object-side external reflection boundary; thereafter extending to the image-side external reflection boundary; thereafter extending to the image-side CR reflection boundary; thereafter extending to the image-side half-mirror; thereafter extending to the image-side CR reflection boundary; thereafter extending to the Image; and
- a second optical path extending from the Object to the object-side half-mirror; thereafter extending to the object-side CR reflection boundary thereafter extending to the object-side external reflection boundary; thereafter extending to the image-side external reflection boundary; thereafter extending to the image-side CR reflection boundary; thereafter extending to the image-side half-mirror; thereafter extending to the Image.

8. The cloaking device of claim 6, wherein the two optical paths comprise:
- a first optical path beginning at the Object; reflecting from the object-side CR reflection boundary; thereafter reflecting from the object-side half-mirror; thereafter reflecting from the object-side CR reflection boundary; thereafter reflecting from the object-side external reflection boundary; thereafter reflecting from the image-side external reflection boundary; thereafter reflecting from the image-side CR reflection boundary; thereafter reflecting from the image-side half-mirror; thereafter reflecting from the image-side CR reflection boundary; thereafter extending to the Image; and
- a second optical path beginning at the Object; transmitting through the object-side half-mirror; thereafter reflecting from the object-side CR reflection boundary; thereafter reflecting from the object-side external reflection boundary; thereafter reflecting from the image-side external reflection boundary; thereafter reflecting from the image-side CR reflection boundary; thereafter transmitting through the image-side half-mirror; thereafter extending to the Image.

9. A cloaking device assembly comprising:
- an object-side, an image-side, a cloaked region (CR) between the object-side and the image-side, and a reference optical axis extending from the object-side to the image-side;
- a first object-side CR reflection boundary, a first object-side external reflection boundary, and a first object-side half-mirror positioned on a first side of the reference optical axis, wherein the first object-side external reflection boundary and the first object-side half-mirror are spaced apart and generally parallel to the first object-side CR reflection boundary;
- a second object-side CR reflection boundary, a second object-side external reflection boundary, and a second object-side half-mirror positioned on a second side of the reference optical axis opposite the first side, wherein the second object-side external reflection boundary and the second object-side half-mirror are spaced apart and generally parallel to the second object-side CR reflection boundary;
- a first image-side CR reflection boundary, a first image-side external reflection boundary, and a first image-side half-mirror positioned on the first side of the reference optical axis, wherein the first image-side external reflection boundary and the first image-side half-mirror are spaced apart and generally parallel to the first image-side CR reflection boundary; and
- a second image-side CR reflection boundary, a second image-side external reflection boundary, and a second image-side half-mirror positioned on the second side of the reference optical axis opposite the first side, wherein the second image-side external reflection boundary and the second image-side half-mirror are spaced apart and generally parallel to the second image-side CR reflection boundary;
- wherein light from an object located on the object-side of the cloaking device assembly and obscured by the CR is redirected around the CR via two optical paths on the first side of the reference optical axis and via two optical paths on the second side of the reference optical axis to form an image of the object on the image-side of the cloaking device assembly such that the light from the object appears to pass through the CR.

10. The cloaking device assembly of claim 9, wherein:
- the first object-side external reflection boundary and the second object-side external reflection boundary are spaced apart and generally parallel to the first object-side half-mirror and the second object-side half-mirror, respectively;
- the first image-side external reflection boundary and the second image-side external reflection boundary are spaced apart and generally parallel to the first image-side half-mirror and the second image-side half-mirror, respectively;
- the first object-side half-mirror and the first image-side half-mirror are positioned between the first object-side external reflection boundary and the first image-side external reflection boundary; and
- the second object-side half-mirror and the second image-side half-mirror are positioned between the second object-side external reflection boundary and the second image-side external reflection boundary.

11. The cloaking device assembly of claim 10, wherein:
the two optical paths on the first side of the reference optical axis comprise:
- a first first-side optical path extending from the Object to the first object-side CR reflection boundary; thereafter extending to the first object-side external reflection boundary; thereafter extending to the first object-side half-mirror; thereafter extending to the first image-side half-mirror; thereafter extending to the first image-side external reflection boundary; thereafter extending to the first image-side CR reflection boundary; thereafter extending to the Image; and
- a second first-side optical path extending from the Object to the first object-side CR reflection boundary; thereafter extending to the first object-side half-mirror; thereafter extending to the first image-side half-mirror; thereafter extending to the first image-side CR reflection boundary; thereafter extending to the Image; and the two optical paths on the second side of the reference optical axis comprise:
- a first second-side optical path extending from the Object to the second object-side CR reflection boundary; thereafter extending to the second object-side external reflection boundary; thereafter extending to the second object-side half-mirror; thereafter extending to the second image-side half-mirror;

thereafter extending to the second image-side external reflection boundary; thereafter extending to the second image-side CR reflection boundary; thereafter extending to the Image; and
a second second-side optical path extending from the Object to the second object-side CR reflection boundary; thereafter extending to the second object-side half-mirror; thereafter extending to the second image-side half-mirror; thereafter extending to the second image-side CR reflection boundary; thereafter extending to the Image.

12. The cloaking device assembly of claim 10, wherein:
the two optical paths on the first side of the reference optical axis comprise:
a first first-side optical path beginning at the Object; reflecting from the first object-side CR reflection boundary; thereafter reflecting from the first object-side external reflection boundary; thereafter transmitting through the first object-side half-mirror; thereafter transmitting through the first image-side half-mirror; thereafter reflecting from the first image-side external reflection boundary; thereafter reflecting from the first image-side CR reflection boundary; thereafter extending to the Image; and
a second first-side optical path beginning at the Object, reflecting from the first object-side CR reflection boundary; thereafter reflecting from the first object-side half-mirror; thereafter reflecting from the first image-side half-mirror; thereafter reflecting from the first image-side CR reflection boundary; thereafter extending to the Image; and
the two optical paths on the second side of the reference optical axis comprise:
a first second-side optical path beginning at the Object; reflecting from the second object-side CR reflection boundary; thereafter reflecting from the second object-side external reflection boundary; thereafter transmitting through the second object-side half-mirror; thereafter transmitting through the second image-side half-mirror; thereafter reflecting from the second image-side external reflection boundary; thereafter reflecting from the second image-side CR reflection boundary; thereafter extending to the Image; and
a second second-side optical path beginning at the Object; reflecting from the second object-side CR reflection boundary; thereafter reflecting from the second object-side half-mirror; thereafter reflecting from the second image-side half-mirror; thereafter reflecting from the second image-side CR reflection boundary; thereafter extending to the Image.

13. The cloaking device assembly of claim 10, wherein:
the first object-side external reflection boundary is coplanar with the first object-side half-mirror and the second object-side external reflection boundary is coplanar with the second object-side half-mirror; and
the first image-side external reflection boundary is coplanar with the first image-side half-mirror and the second image-side external reflection boundary is coplanar with the second image-side half-mirror.

14. The cloaking device assembly of claim 13, wherein:
the two optical paths on the first side of the reference optical axis comprise:
a first first-side optical path extending from the Object to the first object-side CR reflection boundary; thereafter extending to the first object-side half-mirror; thereafter extending to the first object-side CR reflection boundary; thereafter extending to the first object-side external reflection boundary; thereafter extending to the first image-side external reflection boundary; thereafter extending to the first image-side CR reflection boundary; thereafter extending to the first image-side half-mirror; thereafter extending to the first image-side CR reflection boundary; thereafter extending to the Image; and
a second first-side optical path extending from the Object to the first object-side half-mirror; thereafter extending to the first object-side CR reflection boundary; thereafter extending to the first object-side external reflection boundary; thereafter extending to the first image-side external reflection boundary; thereafter extending to the first image-side CR reflection boundary; thereafter extending to the first image-side half-mirror; thereafter extending to the Image; and
the two optical paths on the second side of the reference optical axis comprise:
a first second-side optical path extending from the Object to the second object-side CR reflection boundary; thereafter extending to the second object-side half-mirror; thereafter extending to the second object-side CR reflection boundary; thereafter extending to the second object-side external reflection boundary; thereafter extending to the second image-side external reflection boundary; thereafter extending to the second image-side CR reflection boundary; thereafter extending to the second image-side half-mirror; thereafter extending to the second image-side CR reflection boundary; thereafter extending to the Image; and
a second second-side optical path extending from the Object to the second object-side half-mirror; thereafter extending to the second object-side CR reflection boundary; thereafter extending to the second object-side external reflection boundary; thereafter extending to the second image-side external reflection boundary; thereafter extending to the second image-side CR reflection boundary; thereafter extending to the second image-side half-mirror; thereafter extending to the Image.

15. The cloaking device assembly of claim 13, wherein the two optical paths comprise:
the two optical paths on the first side of the reference optical axis comprise:
a first first-side optical path beginning at the Object; reflecting from the first object-side CR reflection boundary; thereafter reflecting from the first object-side half-mirror; thereafter reflecting from the first object-side CR reflection boundary; thereafter reflecting from the first object-side external reflection boundary; thereafter reflecting from the first image-side external reflection boundary; thereafter reflecting from the first image-side CR reflection boundary; thereafter reflecting from the first image-side half-mirror; thereafter reflecting from the first image-side CR reflection boundary; thereafter extending to the Image; and
a second first-side optical path beginning at the Object; transmitting through the first object-side half-mirror; thereafter reflecting from the first object-side CR reflection boundary; thereafter reflecting from the first object-side external reflection boundary; thereafter reflecting from the first image-side external reflection boundary; thereafter reflecting from the first image-side CR reflection boundary; thereafter transmitting through the first image-side half-mirror; thereafter extending to the Image; and the two optical paths on the second side of the reference optical axis comprise:
- a first second-side optical path beginning at the Object; reflecting from the second object-side CR reflection boundary; thereafter reflecting from the second object-side half-mirror; thereafter reflecting from the second object-side CR reflection boundary; thereafter reflecting from the second object-side external reflection boundary; thereafter reflecting from the second image-side external reflection boundary; thereafter reflecting from the second image-side CR reflection boundary; thereafter reflecting from the second image-side half-mirror; thereafter reflecting from the second image-side CR reflection boundary; thereafter extending to the Image; and
- a second second-side optical path beginning at the Object; transmitting through the second object-side half-mirror; thereafter reflecting from the second object-side CR reflection boundary; thereafter reflecting from the second object-side external reflection boundary; thereafter reflecting from the second image-side external reflection boundary; thereafter reflecting from the second image-side CR reflection boundary; thereafter transmitting through the second image-side half-mirror; thereafter extending to the Image.

16. A vehicle comprising:
an A-pillar; and
a cloaking device positioned on the A-pillar, the cloaking device comprising:
- an object-side, an image-side, and a cloaked region (CR) between the object-side and the image-side, wherein the A-pillar is positioned within the cloaked region, the object-side is positioned on an exterior of the vehicle and the image-side is positioned within an interior of the vehicle;
- an object-side CR reflection boundary, an object-side half-mirror, and an object-side external reflection boundary, wherein the object-side half-mirror and the object-side external reflection boundary are spaced apart and generally parallel to the object-side CR reflection boundary; and
- an image-side CR reflection boundary, an image-side half-mirror, and an image-side external reflection boundary, wherein the image-side half-mirror and the image-side external reflection boundary are spaced apart and generally parallel to the image-side CR reflection boundary;

wherein light from an object located on the object-side of the cloaking device and obscured by the A-pillar is redirected around the A-pillar via two optical paths to form an image of the object on the image-side of the cloaking device such that the light from the object appears to pass through the A-pillar.

17. The vehicle of claim 16, wherein:
the object-side external reflection boundary is spaced apart and generally parallel to the object-side half-mirror;
the image-side external reflection boundary is spaced apart and generally parallel to the image-side half-mirror; and
the object-side half-mirror and the image-side half-mirror are positioned between the object-side external reflection boundary and the image-side external reflection boundary.

18. The vehicle of claim 17, wherein the two optical paths comprise:
- a first optical path beginning at the Object; reflecting from the object-side CR reflection boundary; thereafter reflecting from the object-side external reflection boundary; thereafter transmitting through the object-side half-mirror; thereafter transmitting through the image-side half-mirror; thereafter reflecting from the image-side external reflection boundary; thereafter reflecting from the image-side CR reflection boundary; thereafter extending to the Image; and
- a second optical path beginning at the Object; reflecting from the object-side CR reflection boundary; thereafter reflecting from the object-side half-mirror; thereafter reflecting from the image-side half-mirror; thereafter reflecting from the image-side CR reflection boundary; thereafter extending to the Image.

19. The vehicle of claim 16, wherein:
the object-side external reflection boundary is coplanar to the object-side half-mirror; and
the image-side external reflection boundary is coplanar to the image-side half-mirror.

20. The vehicle of claim 19, wherein the two optical paths comprise:
- a first optical path beginning at the Object; reflecting from the object-side CR reflection boundary; thereafter reflecting from the object-side half-mirror; thereafter reflecting from the object-side CR reflection boundary; thereafter reflecting from the object-side external reflection boundary; thereafter reflecting from the image-side external reflection boundary; thereafter reflecting from the image-side CR reflection boundary; thereafter reflecting from the image-side half-mirror; thereafter reflecting from the image-side CR reflection boundary; thereafter extending to the Image; and
- a second optical path beginning at the Object; transmitting through the object-side half-mirror; thereafter reflecting from the object-side CR reflection boundary; thereafter reflecting from the object-side external reflection boundary; thereafter reflecting from the image-side external reflection boundary; thereafter reflecting from the image-side CR reflection boundary; thereafter transmitting through the image side half-mirror; thereafter extending to the Image.

* * * * *

UNITED STATES PATENT AND TRADEMARK OFFICE
CERTIFICATE OF CORRECTION

PATENT NO. : 10,351,062 B2
APPLICATION NO. : 15/813830
DATED : July 16, 2019
INVENTOR(S) : Kyu-Tae Lee et al.

It is certified that error appears in the above-identified patent and that said Letters Patent is hereby corrected as shown below:

In the Claims

In Column 27, Claim 7, Line 16, after "boundary" insert --;--.

In Column 29, Claim 12, Line 25, after "Object" delete "," and insert --;--, therefor.

Signed and Sealed this
Third Day of September, 2019

Andrei Iancu
*Director of the United States Patent and Trademark Office*